United States Patent
Chang et al.

(10) Patent No.: US 11,888,935 B2
(45) Date of Patent: Jan. 30, 2024

(54) POST-PROCESSING IN A CLOUD-BASED DATA PROTECTION SERVICE

(71) Applicant: Clumio, Inc., Santa Clara, CA (US)

(72) Inventors: Lawrence Jaemyung Chang, San Jose, CA (US); Daniel Michael Hecht, San Carlos, CA (US); Woon Ho Jung, Cupertino, CA (US); Poojan Kumar, San Jose, CA (US); Amber Palekar, Cupertino, CA (US); Hung Hing Anthony Pang, San Jose, CA (US); Kaustubh Sambhaji Patil, Sunnyvale, CA (US); Rishabh Sharma, Santa Clara, CA (US)

(73) Assignee: Clumio, Inc., Santa Clara, CA (US)

( * ) Notice: Subject to any disclaimer, the term of this patent is extended or adjusted under 35 U.S.C. 154(b) by 8 days.

(21) Appl. No.: 16/857,027

(22) Filed: Apr. 23, 2020

(65) Prior Publication Data

US 2020/0349014 A1    Nov. 5, 2020

Related U.S. Application Data

(60) Provisional application No. 62/840,569, filed on Apr. 30, 2019.

(51) Int. Cl.
*G06F 11/14* (2006.01)
*H04L 67/1097* (2022.01)
(Continued)

(52) U.S. Cl.
CPC ...... *H04L 67/1097* (2013.01); *G06F 9/45558* (2013.01); *G06F 9/5083* (2013.01);
(Continued)

(58) Field of Classification Search
CPC ... H04L 67/1097; H04L 9/0618; H04L 9/083; H04L 67/1095; G06F 9/45558;
(Continued)

(56) References Cited

U.S. PATENT DOCUMENTS 7,650,533 B1    1/2010 Saxena et al.
7,685,171 B1    3/2010 Beaverson et al.
(Continued)

FOREIGN PATENT DOCUMENTS

CN           10144158 B       4/2013
CN           103279568 A  *   9/2013
(Continued)

OTHER PUBLICATIONS

Druva, Inc. data sheet—phoenix, www.druva.com, Q119-CON-10882, 2 pages, created May 25, 2018.
(Continued)

*Primary Examiner* — Gautam Sain
*Assistant Examiner* — Wei Ma
(74) *Attorney, Agent, or Firm* — Kowert, Hood, Munyon, Rankin & Goetzel, P.C.

(57) ABSTRACT

A cloud-based data protection service is disclosed. In an embodiment, the data protection service may support backup of data sets from one or more sites associated with one or more organizations. In an embodiment, deduplication of backup data across multiple sites of an organization and/or multiple sites associated with different organizations may be supported. In an embodiment, backup data may be post-processed in the cloud to insert fingerprints corresponding to data blocks that did not change since a previous backup was performed, to scan the backup for security threats such as viruses, other malware, personally identifiable information, etc. In an embodiment, restore may be supported from the cloud, where restore blocks may be
(Continued)

larger than backup data blocks. In another embodiment, restore may be based on blocks that have changed since the most recent backup (or a user-selected backup).

20 Claims, 21 Drawing Sheets

(51) Int. Cl.
```
H04L 9/06       (2006.01)
H04L 9/08       (2006.01)
H04L 67/1095    (2022.01)
G06F 16/14      (2019.01)
G06F 16/182     (2019.01)
G06F 9/50       (2006.01)
G06F 9/455      (2018.01)
G06F 21/62      (2013.01)
G06F 21/56      (2013.01)
G06F 21/10      (2013.01)
```

(52) U.S. Cl.
CPC ...... *G06F 11/1451* (2013.01); *G06F 11/1453* (2013.01); *G06F 11/1461* (2013.01); *G06F 11/1464* (2013.01); *G06F 11/1469* (2013.01); *G06F 11/1484* (2013.01); *G06F 16/144* (2019.01); *G06F 16/156* (2019.01); *G06F 16/182* (2019.01); *G06F 21/6218* (2013.01); *H04L 9/0618* (2013.01); *H04L 9/083* (2013.01); *H04L 67/1095* (2013.01); *G06F 21/107* (2023.08); *G06F 21/567* (2013.01); *G06F 2009/45595* (2013.01); *G06F 2221/033* (2013.01)

(58) Field of Classification Search
CPC ............... G06F 9/5083; G06F 11/1451; G06F 11/1453; G06F 11/1461; G06F 11/1464; G06F 11/1469; G06F 11/1484; G06F 16/144; G06F 16/156; G06F 16/182; G06F 21/6218; G06F 21/567; G06F 2009/45595; G06F 2221/033; G06F 2221/0751; G06F 2201/815; G06F 11/1456; G06F 11/1458; G06F 3/0641
USPC ......................................................... 711/162
See application file for complete search history.

(56) References Cited

U.S. PATENT DOCUMENTS

| | | | |
|---|---|---|---|
| 8,396,841 B1* | 3/2013 | Janakiraman | G06F 3/0608 707/802 |
| 8,700,634 B2 | 4/2014 | Apte et al. | |
| 8,825,972 B1* | 9/2014 | Tsaur | G06F 11/1453 711/162 |
| 8,904,120 B1* | 12/2014 | Killamsetti | G06F 16/1752 711/156 |
| 8,996,467 B2 | 3/2015 | Apte et al. | |
| 9,292,520 B1 | 3/2016 | Madi Raju Varadaraju | |
| 9,298,723 B1 | 3/2016 | Vincent | |
| 9,747,163 B2 | 8/2017 | Apte et al. | |
| 9,749,300 B1 | 8/2017 | Cale | |
| 9,940,203 B1 | 4/2018 | Ghatnekar et al. | |
| 10,133,745 B2 | 11/2018 | Borate et al. | |
| 10,152,487 B1 | 12/2018 | Patwardhan et al. | |
| 10,346,252 B1 | 7/2019 | Gould et al. | |
| 10,437,682 B1 | 10/2019 | Jonnala | |
| 10,606,879 B1 | 3/2020 | Wilkinson et al. | |
| 10,713,072 B1* | 7/2020 | Burgin | H04L 41/0806 |
| 10,747,447 B1* | 8/2020 | Patwardhan | G06F 3/0608 |
| 2004/0143713 A1 | 7/2004 | Niles et al. | |
| 2010/0333116 A1 | 12/2010 | Prahlad et al. | |
| 2011/0047340 A1 | 2/2011 | Olson et al. | |
| 2011/0078303 A1 | 3/2011 | Li et al. | |
| 2014/0006357 A1 | 1/2014 | Davis et al. | |
| 2014/0006375 A1 | 1/2014 | Forte et al. | |
| 2014/0101111 A1 | 4/2014 | Sengupta et al. | |
| 2014/0101113 A1 | 4/2014 | Zhang et al. | |
| 2014/0137112 A1 | 5/2014 | Rigolet | |
| 2014/0201155 A1 | 7/2014 | Vijayan et al. | |
| 2014/0324778 A1 | 10/2014 | Bonnell et al. | |
| 2014/0372384 A1 | 12/2014 | Long et al. | |
| 2015/0227602 A1 | 8/2015 | Ramu et al. | |
| 2016/0004717 A1 | 1/2016 | Singhal et al. | |
| 2016/0182486 A1 | 6/2016 | Wu | |
| 2016/0342618 A1 | 11/2016 | Watkins et al. | |
| 2016/0352827 A1 | 12/2016 | Procopio et al. | |
| 2017/0091047 A1 | 3/2017 | Bangalore | |
| 2017/0147441 A1 | 5/2017 | Binford et al. | |
| 2017/0169038 A1 | 6/2017 | Borate et al. | |
| 2017/0212915 A1 | 7/2017 | Borate et al. | |
| 2017/0262185 A1* | 9/2017 | Long | G06F 3/0605 |
| 2017/0262350 A1 | 9/2017 | Dornemann | |
| 2017/0371547 A1 | 12/2017 | Fruchtman et al. | |
| 2018/0121453 A1* | 5/2018 | Jain | G06F 16/128 |
| 2018/0129569 A1 | 5/2018 | Jathar | |
| 2018/0165161 A1 | 6/2018 | Slater et al. | |
| 2018/0189145 A1 | 7/2018 | Borate et al. | |
| 2018/0293301 A1 | 10/2018 | Borate et al. | |
| 2018/0307839 A1 | 10/2018 | Bhave et al. | |
| 2020/0159421 A1* | 5/2020 | Karumbunathan | G06F 3/0617 |
| 2020/0310918 A1 | 10/2020 | Okayama | |
| 2020/0349013 A1 | 11/2020 | Chang et al. | |
| 2020/0349015 A1 | 11/2020 | Chang et al. | |
| 2020/0349016 A1 | 11/2020 | Chang et al. | |
| 2020/0351347 A1 | 11/2020 | Chang et al. | |

FOREIGN PATENT DOCUMENTS

| | | |
|---|---|---|
| CN | 103279568 A | 9/2013 |
| CN | 108021470 A | 11/2018 |
| EP | 3098714 A1 | 11/2016 |
| TW | I316667 A | 2/2004 |
| TW | 201301063 A | 1/2013 |
| TW | 201324156 A | 6/2013 |
| TW | 201416881 A | 5/2014 |
| TW | 201602802 A | 1/2016 |
| WO | 2016/191152 A1 | 12/2016 |
| WO | 2017/087760 A1 | 5/2017 |

OTHER PUBLICATIONS

Druva, Inc. Cloud Data Protection for VMware Environments, Solution Brief, Q318-CON-10795, 2 pages, created Mar. 5, 2018.
Office Action and Search Report, ROC (Taiwan) Pat. Appln. No. 109114694, dated Jul. 8, 2021, English translation followed by foreign language version, 11 pages.
SRWO, PCT/US2020/029685, mailed Sep. 8, 2020, 17 pages.
ROC (Taiwan) Pat. Appln. No. 109114694, Office Action, English translation followed by TW OA, dated Apr. 12, 2022, 11 pages.
Advisory Action in U.S. Appl. No. 16/857,026 dated Nov. 7, 2022, 3 pages.
Advisory Action in U.S. Appl. No. 16/857,042 dated Nov. 7, 2022, 3 pages.
Office Action in U.S. Appl. No. 16/857,026 dated Jan. 30, 2023, 40 pages.
Office Action in U.S. Appl. No. 16/857,042 dated Feb. 7, 2023, 33 pages.
Examination Report No. 1 in Australian Appl. No. 2020267130 dated Aug. 18, 2022, 4 pages.
Examination Report No. 1 in Australian Appl. No. 2020264946 dated Aug. 19, 2022, 4 pages.
Examination Report No. 1 in Australian Appl. No. 2020267132 dated Aug. 22, 2022, 4 pages.
Examination Report No. 1 in Australian Appl. No. 2020266496 dated Sep. 5, 2022, 4 pages.
Office Action in U.S. Appl. No. 16/857,031 dated Aug. 1, 2022, 14 pages.

(56) References Cited

OTHER PUBLICATIONS

Office Action in U.S. Appl. No. 16/857,031 dated Nov. 18, 2022, 16 pages.
Office Action in U.S. Appl. No. 16/857,031 dated May 1, 2023, 16 pages.
Office Action in U.S. Appl. No. 16/857,042 dated Jun. 6, 2023, 30 pages.
Office Action in U.S. Appl. No. 16/857,026 dated Jun. 27, 2023, 38 pages.

* cited by examiner

POST-PROCESSING IN A CLOUD-BASED DATA PROTECTION SERVICE

This application claims benefit of priority to U.S. Provisional Patent Application Ser. No. 62/840,569, filed on Apr. 30, 2019. The above application is incorporated herein by reference in its entirety. To the extent that anything in the above application conflicts with material expressly set forth herein, the material expressly set forth herein controls.

BACKGROUND

Technical Field

Embodiments described herein are related to a cloud-based data protection service.

Description of the Related Art

Existing data backup mechanisms for data centers generally require dedicated hardware and software installed locally in each data center. The hardware includes one or more backup servers, as well as the disk drives, tapes, or other media onto which the backup data will be stored. The hardware is dedicated for backup and thus sits idle during times that backup is not occurring. Additionally, the system must be designed to handle the "worst case" amount of backup, and thus is often over-provisioned for the typical daily backup tasks. Because the hardware is physically located in the data center, the over-provisioned system must be purchased by the organization that owns the data center, increasing costs to the organization.

The software includes backup software that is installed on the local backup servers. Accordingly, it is the responsibility of the information technology (IT) professionals who staff a data center to maintain the software, determine when upgrades or patches need to be performed, perform those upgrades/patches, etc. There are significant on-going costs related to the maintenance of the backup system that must be borne by the organization.

BRIEF DESCRIPTION OF THE DRAWINGS

The following detailed description makes reference to the accompanying drawings, which are now briefly described.

Figure 1:
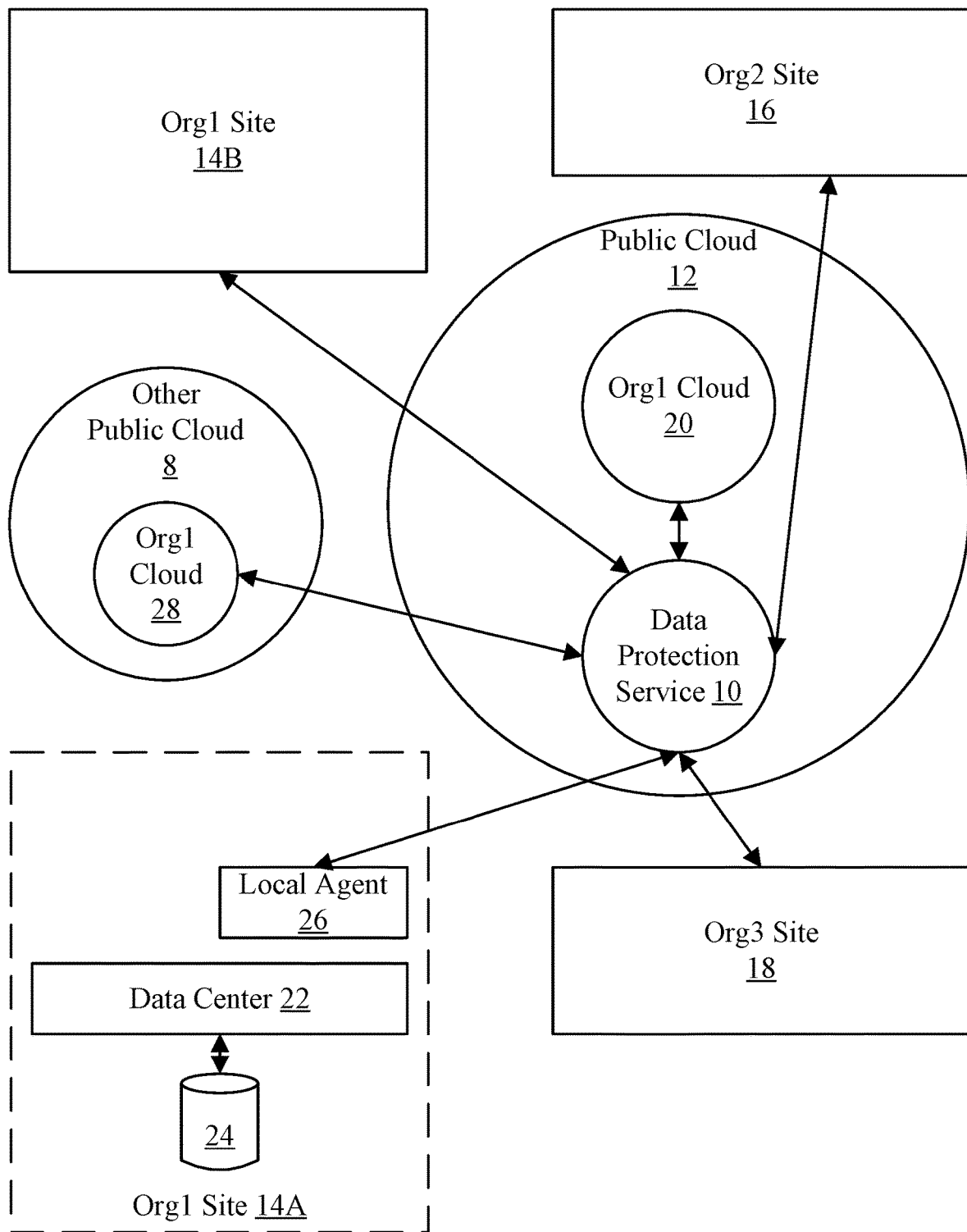
FIG. 1 is a block diagram illustrating one embodiment of a cloud-based data protection service.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit or a memory storing program instructions that are executable to implement the task). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible. Similarly, various units/circuits/components may be described as performing a task or tasks, for convenience in the description. Such descriptions should be interpreted as including the phrase "configured to." The term "configured to" is not intended to mean "configurable to."

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

DETAILED DESCRIPTION OF EMBODIMENTS

Overview (FIGS. 1-4)

FIGS. 1-4 provide an overview of a cloud-based data protection service. The data protection service may provide backup services, and in some embodiments may provide additional services. The additional services may include, but are not limited to, scanning backups for viruses, malware, personally identifiable information (PII), etc. Because the data protection service is provided and maintained in a public cloud, the organization may not be responsible for the costs and logistics of maintaining the backup service software (e.g. upgrades, bug patching, etc.). Additionally, the data protection service may be provided on-demand for the organization, and thus the inefficiencies of having on-site hardware and software to perform data protection may be eliminated. The data protection service may expand and contract capacity in the public cloud dynamically as warranted by the data protection requirements of the organization.

The data protection service may provide a variety of data protections for an organization's data. The data protection service may include, for example, a backup service. The backup service may provide backups of organization data, based on backup policies assigned by the organization. The backup data may be stored in the public cloud. The backup data may be encrypted to protect the data from third party observation while stored in the public cloud or in transit between the public cloud and an organization's site. The backup data may also be compressed to reduce storage footprint and cost for storing the data in the public cloud. The reduced size of the backup data through compression may also reduce the network bandwidth consumed in transmitting the data to the public cloud.

The data protection service may also provide other data protections, in various embodiments. For example, the data protection service may scan the backups for potential security threats. Malware scanning may be provided, for example. Generally, malware may be any software that performs operations on a computer that are not intended or authorized by an organization that owns the computer. The operations have a malicious intent. That is, the operations may be intended to cause damage. The operations may generally be damaging to either the computer, other computers to which the computer is networked, or to the user of the computer (e.g. in the form of theft of personal information such as financial account information or personal data that may be used for identity theft). Malware may have a variety of forms. For example, viruses are a form of malware. A virus may be a program that causes destruction of data on the computer that is infected or that attempts to cause destruction of data on other computers to which the computer is networked. The virus may also be designed to propagate itself to other computers. Other types of malware may include ransomware, which encrypts the computer's data or otherwise renders the data unavailable to the user of the computer until a ransom fee is paid to the malware propagator. Malware may also include various forms of software that attempt to locate valuable data on a computer, such as financial account data or personally-identifiable information that may be used for identity theft. Other malware may monitor a user's interaction with the computer to attempt to identify and capture valuable data such as passwords, account numbers, etc. (e.g. spyware). Malware is typically installed using various forms of stealth or subterfuge such that the user is typically not aware that the malware is installed, at least until the malware is able to execute and cause damage. Thus, scanning for malware may protect the data from the effects of the malware and/or may permit recovery from previous uninfected backups when infection is detected.

Another data protection service may be the detection of personally-identifiable information (PII) in the backup data. PII may include financial account information (e.g. credit card accounts, checking accounts, savings accounts, etc.), passwords, and other data that may be used to steal from a user directly. Other PII data may include data that identifies the user to third parties, and this may be used to impersonate the user to steal from the third parties (e.g. using identity theft to open credit accounts in the user's name, which may ultimately lead to credit losses when the user proves that they did not actually open the account). PII data that identifies the user to third parties may include any sort of government-issued identifier, such as social security numbers, driver's license numbers, passport numbers, etc. PII data may further include other data such as address information, phone numbers, email addresses, etc.

Since the data protection service is located in the public cloud, it may generally be available to multiple organizations concurrently. That is, the data protection service may be multi-tenant, providing data protection services for the multiple organizations using the same instance of the service.

Traditional on-site backup mechanisms implemented in the organization sites may generally be designed with tradeoffs used to maximize performance in performing the backups. The data protection service, on the other hand, may be designed to further ensure cost efficiency. For example, there may be different classes of storage available in the public cloud, which may have different monetary costs associated with them. These costs may vary significantly, e.g. one type of storage may cost a multiple of another type of storage. Multiples may be on the order of 6-8 times, for example, or even orders of magnitude. Similarly, there may be multiple mechanisms for obtaining computing resources in the public cloud, each of which may have an associated cost. When acquiring additional processing resources to satisfy demand, the data protection service may attempt to optimize the cost of the additional processing resources.

The cloud-based data protection service may be scalable to high levels of demand, using the processing resources available in the cloud to dynamically expand as much as needed to provide the data protection to a given organization and/or the multiple tenants of the data protection service. Once the demand is satisfied, the processing resources may be released, scaling down to more minimal processing resources to continue operation at lower demand levels.

FIG. 1 is a block diagram illustrating one embodiment of a data protection service 10 located on a public cloud 12. The data protection service 10 may be configured to provide data protection for data generated at one or more sites of an organization. For example, a first organization may have sites 14A and 14B.

Additionally, the first organization may have its own cloud account 20 within the public cloud 12, which may use cloud computing resources for execution of various applications used by the organization instead of executing those applications in an on-site data center. A second organization may have one or more sites such as a site 16, and a third organization may have one or more sites such as a site 18. The first, second, and third organizations may be tenants of the data protection service 10. In an embodiment, the first organization may also have an account a different public cloud (e.g. other public cloud 8, with Org1 cloud 28 belonging to the first organization). The other public cloud 8 may be provided by a different public cloud provider. The data protection service 10 may provide data protection services for the Org1 cloud 28 as well. Generally, a public cloud may be any cloud offered by an organization as a service for used by other organizations. In some cases, an organization or group of organizations may have a private cloud. While public cloud is used as an example herein, where appropriate, a private cloud or simply a cloud may be used.

Each site for an organization may include a data center, such as the data center 22 shown in the organization site 14A. Thus, a site may generally include a physical location at which a data center belonging to the organization may be placed. A data center may include one or more computer systems ("servers") that execute software used by the organization, which may generate data stored on one or more storage devices 24. The software may also be stored on the storage devices 24. The storage devices 24 may include any type of non-transitory computer data storage that is readable/writable by the computer. For example, the storage devices 24 may include one or more disk drives. The disk drives may be magnetically-based drives (e.g. "hard drives"), optically-based drives such as compact disk or digital video disk drives, solid state drives formed from various forms of integrated-circuit based non-volatile memory (e.g. flash memory), etc. The storage devices 24 may include other forms of memory, including volatile memory such as random access memory (static random access memory or "SRAM", dynamic random access memory or "DRAM", etc.). Any type and/or combination of storage devices may be used in various embodiments. Thus, a data center generally includes any configuration of computing resources that may be provided at a site to provide the any sort of computing services for users at that site. That is, a data center includes at least one computer (e.g. a server) and may include more than one computer or server, as well as one or more storage devices.

Figure 2:
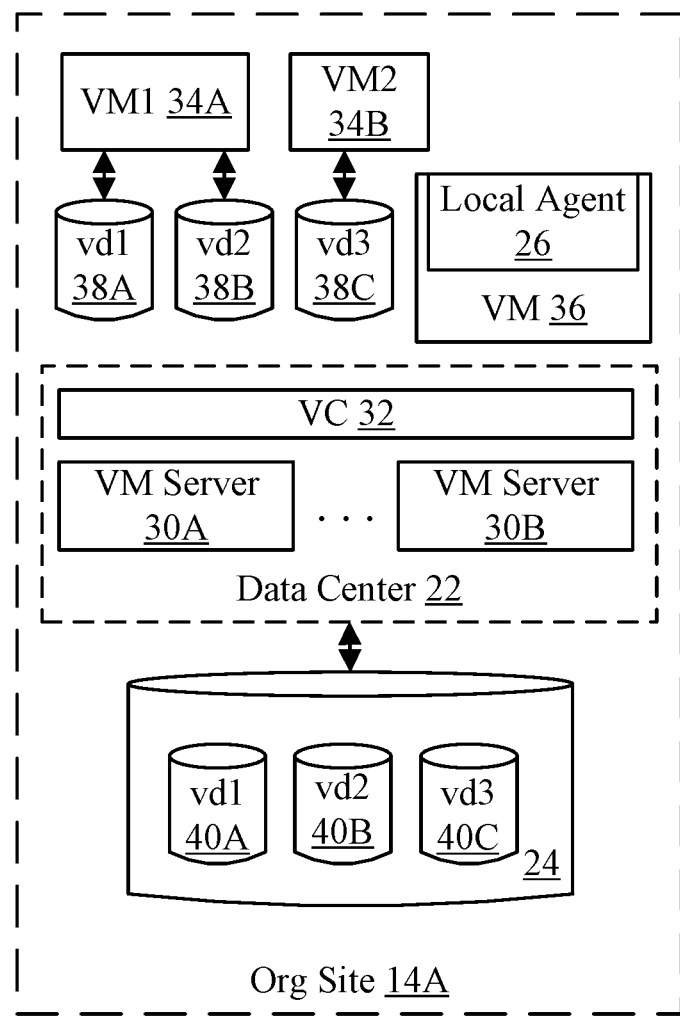
FIG. 2 is a block diagram illustrating one embodiment of a virtual machine (VM)-based data center.
Figure 3:
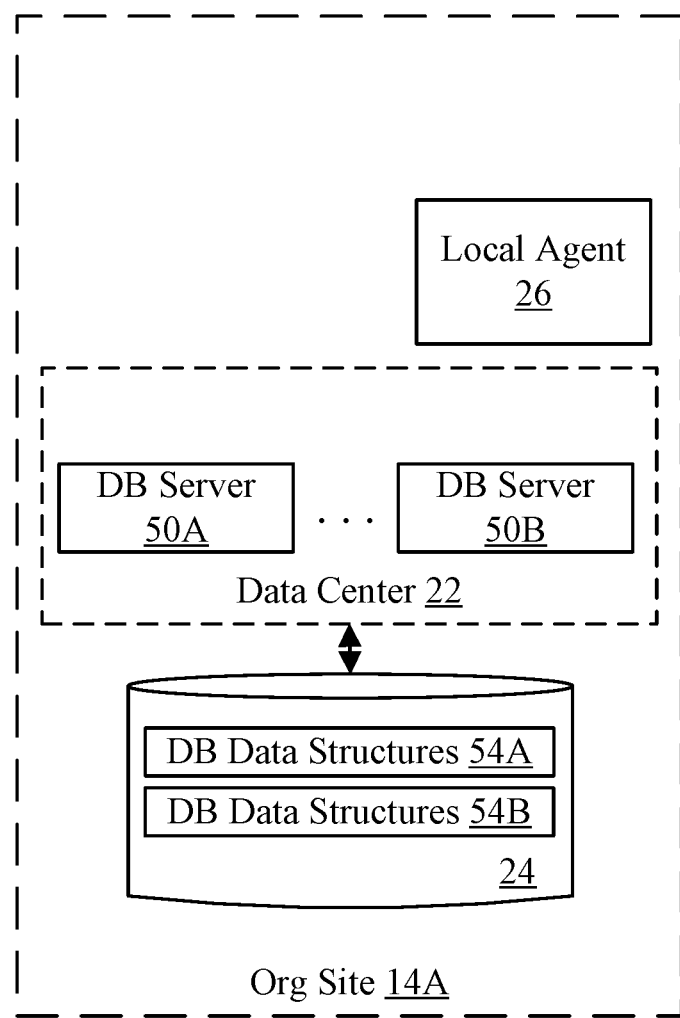
FIG. 3 is a block diagram illustrating one embodiment of a data base (DB)-based data center.
Figure 4:
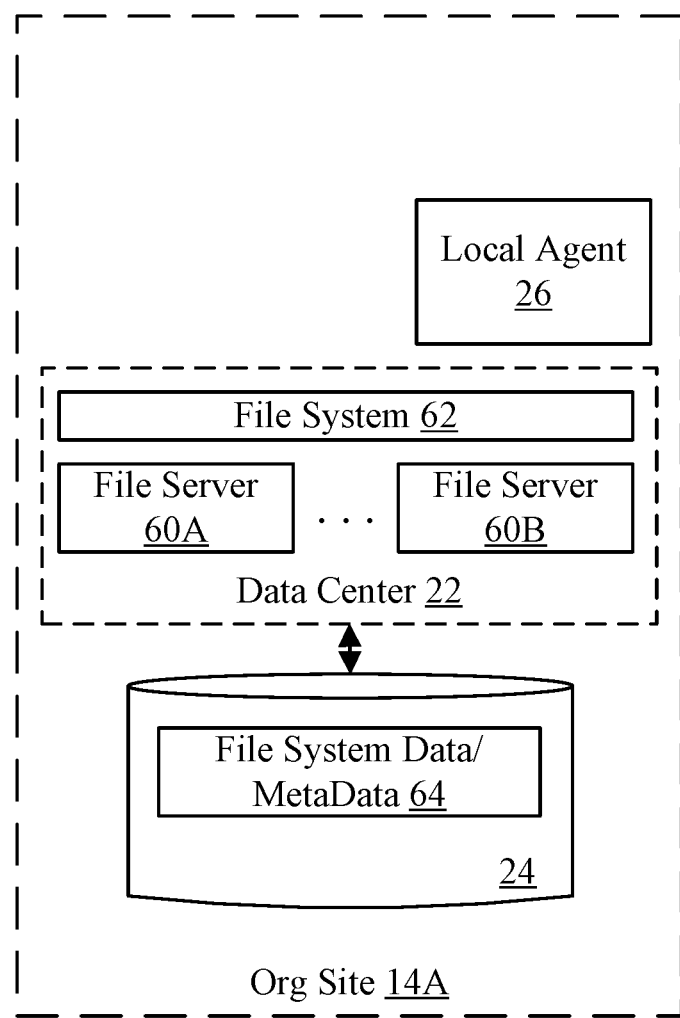
FIG. 4 is a block diagram illustrating one embodiment of a file system-based data center.

The data center 22 may generally support access by various other devices at the site 14A. For example, users may have various computers to access the data center 22 and execute the software to perform the user's function within the organization. Users computers may include laptops, desktops, tablet computers, mobile devices such as smart phones, or other computer systems that are networked to the data center's servers so that the users may invoke the software executed by the servers. Various examples of data centers 22 are shown in FIGS. 2-4.

In an embodiment, the data protection service 10 may employ a local agent in the organization sites 14A-14B, 16, and 18 (e.g. the local agent 26 illustrated in the organization site 14A in FIG. 1). The local agent 26 may interact with the data protection service 10 to implement the data protections supplied by the data protection service 10. More particularly, the backup service may include a data path from the data center 22 to storage in the public cloud 12 and the data protection service 10, which may include the local agent 26. The local agent 26 may be installed by the organization's IT professionals when the organization registers with the data protection service 10. The data protection service 10 may generally be capable of automatically upgrading and maintaining the local agent 26 once installed, without the involvement of the organization's IT professionals, and thus may minimize the demands on the organization and its IT professionals. The local agent 26 may respond to requests from the data protection service 10 to provide backup data from the data center 22.

For example, the local agent 26 may be configured to determine which blocks of data have changed since a most recent backup, compress and encrypt the blocks, assemble the blocks in a format used by the data protection service 10, and write the assembled data to the public cloud storage. The data protection service 10 may transmit messages to the local agent 26 to perform each of the above actions to update a given set of data from the storage devices 24.

In an embodiment, the data protection service 10 may support deduplication of data blocks when the content of a given data block is already stored elsewhere within the public cloud 12 by the data protection service 10 (e.g. in a different backup, a different backup from a different site, or even a different backup from a different organization, in various embodiments). Instead of storing another copy of the data block, the data protection service 10 may support a mechanism to track data block contents and store one copy of the data block, which may be referenced by multiple backups from different data sets from the site, different sites of an organization, etc. The local agent 26 may interact with the data protection service 10 to identify blocks for which the content is already stored by the data protection service 10 and to exclude those blocks from the backup data in favor of a reference to the already-stored data block. In one embodiment, one or both of fixed block deduplication and/or variable length deduplication may be supported. Additional details will be provided below.

In an embodiment, the data protection service 10 may attempt to minimize the time that the local agent 26 is involved in the overall backup operation. The data protection service 10 may perform a variety of post-processing tasks after receiving the backup data from the local agent 26, effectively declaring the backup to be complete from the point of view of the organization while the data protection service 10 continues processing on the backup. The post-processing may include updating the backup metadata with data identifying the blocks that have not changed from the previous backup, for example. The post-processing may include restoring the backup and verifying the backup. The post-processing may include the malware scanning discussed previously. The post-processing may also include generation of a file index identifying various files within the backup data, to support file-level restores.

In an embodiment, the data protection service 10 may support a restore of an entire backup data set or a file within the backup data set. When the entire backup data set is restored, the data protection service 10 may restore the backup data set using public cloud resources (e.g. assembling the data blocks from various incremental backups and/or from other backup data sets when deduplication is used). The data protection service 10 may compress and encrypt the data in restore blocks, which may be larger than the data blocks used for backup and deduplication detection. Better compression results may often be achieved with larger restore blocks, and since the data set may be viewed as sequential data it may be more efficient to use larger blocks. The restore blocks may be encrypted with a temporary key, which may be provided to the local agent 26 to decrypt the blocks. The restore blocks may be placed in public cloud storage to be accessed by the local agent 26.

In one embodiment, the data protection service 10 may support a change-based restore based on the differences between the current state of the data set at the data center 22 and the backup from which the restore is being performed. Similar to the creation of an incremental backup, in which only the blocks that have changes since a previous backup are included in the incremental backup, the data protection service 10 may use the change tracking at the data center 22 to determine which blocks were changed between the current state of the data set and the backup being restored. The change-based restore may obtain the blocks from the backup for each block that has changed, and restore only those blocks to the current data set. Blocks that have not been changed need not be assembled, stored in the cloud storage, and retrieved by the local agent 26. The change-based restore may result in the state of the data set being returned to the state at the time of the backup, without requiring that the complete data set to be copied.

Generally, the public cloud 12 may include a set of computing resources and storage that are maintained by a third-party public cloud provider and are made available over a public network (such as the Internet) to users of the public cloud 12 on an as-needed basis for a fee. There are a variety of public cloud providers. For example, Amazon Web Services (AWS), provided by Amazon, Inc. (Seattle, WA) is a public cloud 12. Other examples include the Azure service provided by Microsoft Corporation (Redmond, WA), Oracle cloud provided by Oracle Corporation (Redwood City, CA), Google Cloud by Google LLC (Mountain View, CA), etc. Any public cloud provider may be used. The other public cloud 8 may be any of the public cloud providers above, except that the provider of the other public cloud 8 may be different from the public cloud 12.

The data protection service 10 may execute on the public cloud 12, using the public cloud's computing resources to perform the data protection service and using the public cloud's storage to store backup data for the organizations served by the data protection service 10. That is, the data protection service 10 may be provided by an organization other than the organization that owns the public cloud, and the organization providing the data protection service 10 may be a different organization for the organizations that own the sites 14A-14B, 16, and 18.

A given organization (e.g. the organization that owns the sites 14A-14B) may also have a cloud account in the public cloud 12 (e.g. the org1 cloud 20 in FIG. 1). The organization may have various software that is executed using the public cloud computing resources, and which may have data stored in the public cloud 12 as well. The data protection service 10 may be configured to backup data from the organization's cloud 20 as well. For example, the public cloud 12 may support an application programming interface (API) that permits access to the data within a given cloud account by another cloud account. The organization may permit the data protection service 10 to use the API to capture data from the cloud account for backup. For example, the AWS cloud may support an identity and access management (IAM) Role that permits data access, and the organization may grant permissions through the IAM Role to permit the data protection service 10 to backup data from the organization cloud 20. Particularly, the IAM Role may be used to list virtual machines that are in the organization cloud 20, take snapshots of the virtual machines, and copy the snapshot data.

In the case of the other public cloud 8, a similar mechanism to the local agent 26 may be used to capture data from the organization's cloud 28. That is, the organization's IT professional may install a local agent in the organization's cloud 28, which may receive messages from the data protection service 10 to back up data from the organization's cloud 28. Both the Org1 cloud 20 and the Org1 cloud 28 may generally be viewed as sites from which backups may be performed by the data protection service 10. In one embodiment, a local agent may only have permission to write its own backup data and may not have permission to read/write other customer data. After the backup data is written, the local agent may not have permission to read the backup data. In an embodiment, a restore may be initiated from the data protection service 10, and the data protection service 10 may preprocess the backup data and create a restore copy of the backup data that the local agent may have permission to access. The restore copy may be automatically deleted after some period of time. The restore copy is encrypted and compressed and thus only the local agent responsible for the restore may have the plaintext key to decrypt the restore copy for the purpose of restore.

The data protection service 10 is configured to store data for different entities or groups of entities, referred to as organizations herein. That is, as mentioned above, the data protection service 10 is multi-tenant. The data protection service 10 associates the data for each tenant, or organization, with identifying information, which is referred to herein as an organization ID or OrgID. The OrgID permits the data protection service 10 to distinguish data of different tenants and, when appropriate, keep the data corresponding to a particular OrgID separate from data corresponding to other OrgIDs.

The data protection service 10 allows new tenants or organizations to be established, each with its own OrgID. The data of a tenant or organization within the data protection service 10 is all data that is associated with the OrgID for that tenant or organization. Accordingly, the concept of a tenant or organization is an expansive one, referring to any entity that has requested or established that the data protection service 10 should treat a set of data as distinct from other data being handled by the data protection service 10 (i.e., data having a different OrgID).

It should be noted that the legal status or composition of a tenant or organization is not relevant to the data protection service 10. The data protection service 10 receives requests to create accounts for organizations, establishes OrgIDs for those organizations, receives data associated with those OrgIDs, and then proceeds to perform data protection for that data, regardless of who the tenants or organizations are.

In some cases, an organization is a legal entity such as a corporation, and the data protection service 10 identifies all data for that legal entity with a single OrgID. In other cases, an organization might be a subdivision of a legal entity (e.g., the accounting department of a corporation). Some entities may establish multiple OrgIDs with the data protection service 10 for different portions of the entity (e.g., an accounting department, a sales department, and an engineering department might each have separate OrgIDs). In general, an entity may choose to set up one or more OrgIDs for its data, according to that entity's needs and/or desires. For example, a particular entity might choose to set up different OrgIDs for different virtual machines, filesystems, or other divisions of data at one or more of its data sites. Alternately, each site owned by an entity could be a different organization with the data protection service 10, or groups of sites may be a single organization (e.g. sites within a geographic region).

However, an organization does not need to correspond to a single business entity, or portion thereof. Multiple legal entities might choose to protect their collective data with the data service 10 under a single OrgID. Non-business entities may be organizations in the context of the data protection service 10. Thus, groups of individuals or even a single individual may be an organization that stores data with the data protection service 10.

While OrgIDs within the data protection service 10 are necessarily unique, in some cases OrgIDs may have a format that permits the data protection service 10 and/or other services, programs, etc. to understand that certain OrgIDs have some relationship to one another. As noted above, a corporation might wish to establish different OrgIDs for different portions of the company. If the OrgID has a format <entity><subdivision> or the like, this would allow each of these portions to have the same <entity> value for the OrgID, but still have a unique overall OrgID within the data protection service 10 because the <subdivision> value would vary for each portion of that entity. This formatting might help facilitate certain types of functionality by the data protection service 10. In other implementations, however, each OrgID may be unique and have no discernible relationship to any other OrgID within the data protection service 10.

FIG. 2 is a block diagram of one embodiment of an organization site 14A in which the data center 22 is a virtual machine data center. In this embodiment, the data center includes multiple virtual machine (VM) servers such as servers 30A-30B and a virtual center (VC) 32 that manages the execution of virtual machines on the VM servers 30A-30B. That is, the VC 32 may schedule various virtual machines for execution on the VM servers 30A-30B (e.g. virtual machines 34A-34B in FIG. 2, and a virtual machine 36 including the local agent 26).

The VM servers 30A-30B may be computer systems that execute the virtual machine server software and supports the execution of virtual machines. For example, the VM servers 30A-30B may execute the ESX virtual machine software supplied by VMWare Inc., a subsidiary of Dell Technologies Inc. (Round Rock, TX). Other virtual machine software from other vendors (e.g. Oracle, Microsoft, etc.) may be used. The VC 32 may be executed by the VM servers 30A-30B or a separate server that is dedicated to the VC 32, in various embodiments.

A virtual machine may be an emulation of a computer system. Any set of virtual hardware may be defined for the virtual machine (e.g. numbers of processors, clusters or processors, peripheral devices, etc.). When the virtual machine is executed on one of the VM servers 30A-30B, the virtual hardware may be mapped to the physical hardware in the VM server 30A-30B under the control of the VM server software. If there are devices in the virtual machine that do not exist in the VM servers 30A-30B, such devices may be software-emulated.

Each virtual machine may include at least one virtual disk, and a given virtual machine may have more than one virtual disk. For example, the virtual machine 34A in FIG. 2 includes two virtual disks vd1 and vd2 (reference numerals 38A-38B in FIG. 2), and the virtual machine 34B includes one virtual disk vd3 (reference numeral 38C in FIG. 2). The virtual disks may store the operating system executed by the virtual machine, as well as the application software that is needed by the user of the virtual machine. The virtual disks may further store various data generated by the user via execution of the software (or used by the user during execution of the software). Each user in the organization and at the site 14A may have a virtual machine that the user executes to perform that user's function in the organization. The user may have a computer that interfaces to the data center 22 and invokes the virtual machine, and the computer's display may be driven by the output of the virtual machine, so it appears to the user as if the computer is executing the application software used by the user. However, the software may actually be executed within the virtual machine, that is hosted on the VM server 30A-30B (time shared with other virtual machines as needed).

The virtual machine may be described by one or more configuration files (not shown) which may be stored on the storage 24. Additionally, each virtual disk 38A-38C is stored as a respective file 40A-40C on the storage 24. Accordingly, a backup of the virtual machine may include the configuration file(s) and the virtual disk files that correspond to the virtual machine.

The contents of the virtual disk file 40A-40C may be the blocks of data stored on the virtual disk. Logically, the blocks may be stored in order from offset zero at the beginning of the virtual disk file to the last offset on the virtual disk at the end of the file. For example, if the virtual disk is 100 megabytes (MB), the virtual disk file is 100 MB in size with the byte at offset 0 logically located at the beginning of the file and the byte at offset 100 MB at the end of the file. The actual physical layout of blocks in the file may be different, and there may be more than one file representing a virtual disk. There may be levels of indirection between the logical order of blocks on the virtual disk and the physical placement of the blocks in one or more files representing the virtual disk. There may be multiple physical formats for the virtual disk file, and the virtual machine may choose physical formats as desired for efficiency and/or performance of the virtual machine. In an embodiment, the virtual machine may manage the physical placement and retrieval of blocks. The local agent 26 may request logical blocks from the virtual machine and the virtual machine may return the blocks from the virtual disk file or files.

The local agent 26 executes within a virtual machine 36 as well, in this embodiment. The local agent 26 may be able to communicate with the VC 32 when the virtual machine 36 is scheduled, in order to discover the other virtual machines 34A-34B at the site 14A, to request snapshots of the virtual machines 34A-34B, to read data from the virtual disk files 40A-40C and VM configuration files to make backups, etc. Additional details will be provided further below for some embodiments.

FIG. 3 is a block diagram of one embodiment of an organization site 14A in which the data center 22 is a database system. In this embodiment, the data center 22 includes multiple database (DB) servers such as servers 50A-50B. Each DB server 50A-50B may host one or more databases, and the data in those databases may be stored on the storage 24. Each DB server 50A-50B may have one or more DB data structures stored on the storage 24. For example, the DB data structures 54A may be the database data managed by the DB server 50A, and the DB data structures 54B may be the database data managed by the DB server 50B. The DB server 50A-50B that hosts a given database may receive various transactions to be performed on the given database from users at the site 14A, and may coordinate updates and queries represented in the transactions. The database data structures 54A-54B may include various tables that may be indexed by various keys and may be relational or non-relational constructs, object-oriented constructs, etc.

The local agent 26 may communicate with the DB servers 50A-50B to back up the DB data structures 54A-54B. For example, the local agent 26 may request that the DB server 50A-50B temporarily stop accepting new transactions for a given database, complete any outstanding transactions, and snapshot the DB data structures 54A-54B for the data protection service 10 to back up.

FIG. 4 is a block diagram of one embodiment of an organization site 14A in which the data center 22 is a file system that is accessible to other user devices in the site 14A. In this embodiment, the data center 22 includes multiple file servers such as servers 60A-60B and file system control software 62 that executes on the file servers 60A-60B and provides access the file system. Users may access and update data on the storage 24 via file system commands presented to the file system 62, under control of various permissions assigned to the users. Any type of file system may be used, such as the virtual machine file system (VMFS) that is used by the VMWare virtual machine system, the network file system (NFS), the Andrew file system (AFS), various Windows® operating system filesystems such as file allocation table (FAT) or NT filesystem, the Apple file system used by Apple computers and mobile devices, etc. The file system data and metadata 64 may be the data to be backed up by the data protection service 10 in this embodiment.

The local agent 26 may communicate with the file system 62 to back up the file system data/metadata 64. For example, the local agent 26 may request that the file system 62 temporarily stop file system updates and close files to create a coherent copy of the file system, which may be snapshotted for the data protection service 10 to back up. The filesystem 62 may resume accepting file updates after the snapshot has occurred and/or after the backup is complete, in various embodiments.

For the remainder of this disclosure, the virtual machine-based data center illustrated in FIG. 2 will be used an example. However, many of the features of the data protection service 10 apply equally to database or file system embodiments as well, and such embodiments are contemplated within the spirit of this disclosure.

Figure 5:
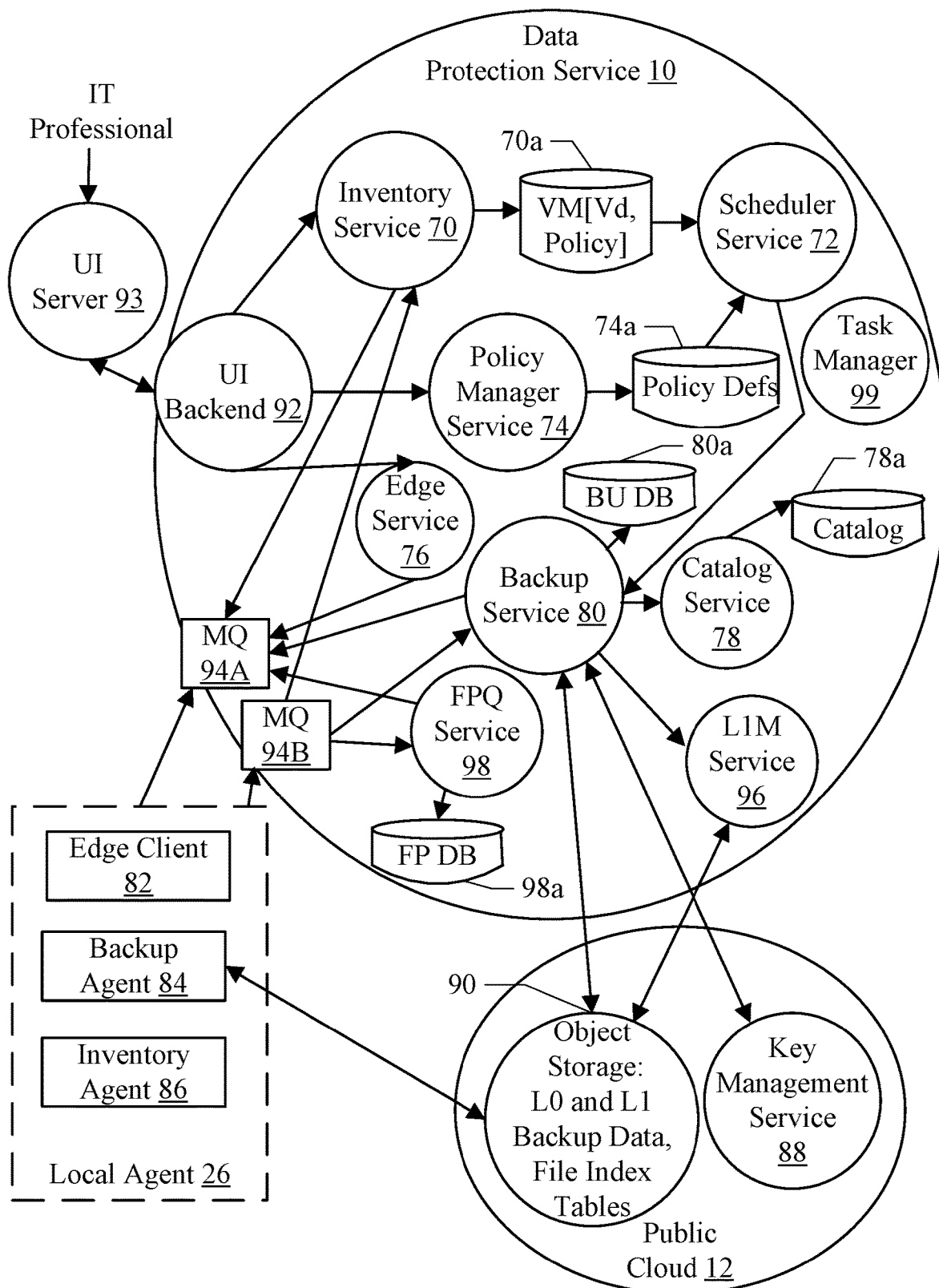
FIG. 5 is a block diagram illustrating the data protection service of FIG. 1 in greater detail for an embodiment.

Example Data Protection Service (FIG. 5)

FIG. 5 is a block diagram illustrating an embodiment of the data protection service 10 and the local agent 26 in greater detail. The public cloud 12 is shown separate from the data protection service 10 in FIG. 5 to illustrate certain services and storage that are part of the public cloud 12 but used by the data protection service 10. However, the data protection service 10 itself executes in the public cloud 12 as previously discussed, using cloud computing resources.

In the illustrated embodiment, the data protection service 10 includes an inventory service 70, a scheduler service 72, a policy manager service 74, an edge service 76, a catalog service 78, a backup service 80, a finger print query (FPQ) service 98, an L1 merge (L1M) service 96, a task manager 99, a user interface (UI) backend 92, and a UI server 93. The local agent includes an edge client 82, a backup agent 84, and an inventory agent 86. The public cloud 12 includes a key management service 88 and an object storage 90. Some of the services in the data protection service 10 include corresponding storage, such as the inventory service 70 (storage 70a), the policy manager service 74 (storage 74a), the catalog service 78 (storage 78a), the backup service 80 (storage 80a) and the FPQ service 98 (storage 98a). The storage 70a, 74a, 78a, 80a, and 98a may be block storage supported by the public cloud 12 (e.g. elastic block store, or "EBS" in the AWS public cloud). The block storage may support a block-based storage and access mechanism, similar to the access model for disk drives and the like. The object storage 90 (e.g. simple storage service, or "S3" storage in the AWS public cloud) supports an object-based storage model in which objects may be placed in the storage ("put") and read from the storage ("get") as complete objects.

The block storage may be random access, lower latency storage than the object storage 90, but may also cost more in fees paid to the public cloud provider that provides the public cloud 12. For example, in an embodiment the expense of the block storage may be 6-8 times the expense of the object storage 90. Accordingly, for data that may not be required to be accessed quickly and/or for data that is to be retained for long periods of time but infrequently accessed, such as the backup data, the object storage 90 may be used. Data that may be accessed more frequently and/or data for which low latency is needed to support performance may be stored on the block storage.

An IT professional with an organization may use a UI server 93 to interact with the data protection service 10. For example, the UI server 93 may be connected to a well-known endpoint address, such as a universal resource locator (URL) of the website of the organization that owns the data protection service 10 (the "data protection organization"). The IT professional may connect to the UI server 93 with, e.g., a web browser running on the IT professional's computer or in the IT professional's virtual machine. The UI server 93 may provide content to the browser to display to the IT professional, permitting the IT professional to configure the data protection service 10 as desired for the organization. The browser/UI server 93 may serve as a "single pane of glass" for interaction between the IT professional and the data protection service 10, simplifying the configuration and maintenance of the data protection for the organization. The UI server 93 may communicate with the UI backend 92 to interact with the data protection service 10 (and various services within the data protection service 10, e.g. as illustrated in FIG. 5). In an embodiment, the data protection organization may publish a set of public application programming interfaces (APIs) that may be used by scripts or other programs invoked by the IT professional to implement the various operations described herein. A combination of APIs and interaction with the UI server 93 may be used in various embodiments.

Initially, the IT professional may use the UI server 93 to register for the data protection service 10, creating an account with the data protection organization. As part of the registration, the UI server 93 may prompt the IT professional to download the local agent 26 and install the local agent 26 in the data center 22 (and any other data centers at other sites corresponding to the organization, as desired). The UI server 93 may also provide a token that uniquely identifies the site (e.g. the site 14A). When the IT professional installs the local agent 26, the installation procedure may request the token, which is provided by the local agent 26 to the data protection service 10. Once the local agent 26 is installed, the IT professional may largely be relieved of responsibility to keep the data protection service 10 updated. The data protection service 10 itself, including the various services shown in FIG. 5, may be upgraded on the public cloud 12 and need not involve the organization's sites or any installation there. Additionally, in an embodiment, the edge service 76/edge client 82 may cooperate to upgrade the backup agent 84 and the inventory agent 86, as needed. In an embodiment, most of the edge client 82 may be upgradeable via the edge service 76 as well. There may be a small section of code that actually updates the code within the local agent 26 that may require manual upgrade. In such cases, the IT professional may be notified to reinstall the local agent 26. However, it is expected that such upgrades will be infrequent.

A set of message queues 94A-94B may be provided to facilitate communication between the local agent 26 and the data protection service 10. The message queue 94A may be a "down queue" that receives messages from the data protection service 10 for the local agent 26, while the message queue 94B may be an "up queue" that may carry messages from the local agent 26 to the data protection service 10. The local agent 26 (and more particularly the clients/agents 82, 84, and 86) may be configured to poll the message queue 94A for messages directed to each client/agent, and may be configured to write the message queue 94B with any messages being provided to the data protection service 10. Thus, communication with the local agent 26 may be sourced, in each case, by the local agent 26, which may comply with firewall/security rules of the organization (as compared to the messages from the data protection service 10 being pushed through from the message queue 94A, for example). In an embodiment, each client/agent 82, 84, and 86 may have a separate set of message queues 94A-94B, and thus the message queues 94A-94B as illustrated in FIG. 5 may represent multiple up queues and multiple down queues. A shared message queue embodiment may also be used, in other embodiments. The message queues 94A-94B may be used for relatively small control request/response messages with small data payloads. Larger data transfers, e.g. the backup data for a given backup operation, may be transmitted through the object storage 90.

The inventory agent 86/inventory service 70 may cooperate to perform an inventory of the site containing the local agent 26, to discover the virtual machines that exist on the site and the configuration of each virtual machine. More particularly, the inventory service 70 may send a message to the inventory agent 86 through the message queue 94A, requesting an inventory. The inventory agent 86 may communicate with the VC 32, which maintains a listing of the virtual machines in the site and the configuration of the virtual machines. The inventory agent 86 may receive the listing, and may return the list to the inventory service 70 through the message queue 94B. The inventory service 70 may record the virtual machine names and their virtual disk configuration in the block storage 70a. The inventory may be conducted when the organization first registers for the service, to get an initial inventory. The inventory may be conducted again at later points to update the list with any newly added virtual machines or deleted virtual machines, as well as capturing changes to existing virtual machine configurations. In an embodiment, the inventory may also capture non-VM objects and the inventory may capture the creation, deletion or update of such objects as well. For example, the inventory may be conducted at periodic intervals as specified by the IT professional and/or at minimum intervals determined by the configuration of the data protection service 10. The IT professional may manually trigger an inventory through the UI server 93 as well, in some embodiments. For other types of data centers, the inventory may be performed to identify the data sets to be backed up. For example, file systems may be the data sets, or subsets of the file system such as various volumes of the file systems. Databases may be the data sets, or subsets of the databases such as particular tables or groups of tables. The non-VM objects may include various VM organizational structures including, but not limited to: VM clusters, VM folders, tags and categories (key-value pairs that may be assigned to VMs for administrators of the VMs to use to locate and identify VMs), VM networks, etc.

The IT professional may also define a set of backup policies for the virtual machines or other data sets. A variety of policies may be specified, based on the importance of the data in various virtual machines/data sets to the organization. Data of high importance may be backed up more frequently than data of lower performance, for example. The policies may specify frequency of backups, retention requirements for backups, whether or not file indexes are generated for each backup, etc. The UI server 93 may provide an interface for the IT professional to define the policies, and the UI backend 92 may communicate with the policy manager service 74 to capture the policy definitions. In addition to specifying the policies, the IT professional may attach policies to the virtual machines/data sets in the inventory, illustrated as the policy field in the block storage 70a. The UI backend 92 may transmit the policy labels to the inventory service 70 in response to the IT professional assigning or changing the policy assigned to a given virtual machine or machines. The policies themselves may be stored in the policy definitions storage 74a, and the policies may be changed without changing the labels to update the policy applied to each virtual machine labeled with that policy.

The scheduler service 72 may scan the inventory on the block storage 70a and the policy definitions in the block storage 74a to determine when the next backup of a given virtual machine/data set is to be performed. At the determined times, the scheduler service 72 may transmit a request to the backup service 80 to backup one or more virtual machines/data sets from the site 14A.

For each backup request from the scheduler service 72, the backup service 80 may coordinate with the backup agent 84 to perform the backup. The backup agent 84 may determine the blocks in the virtual disk that have been modified since the most recent backup, transmit fingerprints for the changed blocks to perform deduplication, assemble the backup data and put it in the object storage 90, and communicate object identifiers for the backup data in the object storage 90 to the backup service 80. Once the object identifiers have been received, the backup may be presumed complete by the local agent 26/organization site 14A, even though there may be post processing by the backup service 80 to produce a complete backup record and to perform verification of the backup, scanning for malware and other security issues, etc. Additional details regarding the operation of the backup service 80 and the backup agent 84 are provided below for various embodiments. In similar fashion, other data sets such as file systems or portions thereof, or databases or portions thereof, may be backed up. The backup service 80 may maintain a backup database (BU DB) on the storage 80a to store various data related to backups that have been performed. For example, file identifiers assigned to a given virtual disk for each backup may be stored in the storage 80a, to permit object identifiers to be regenerated to obtain the backup data. Alternatively, various object identifiers may be stored for each backup in the backup database. The backup service 80 may assign a backup identifier (ID) for each backup, and entries in the backup database associated with a given backup may include the backup ID. The catalog service 78 may record the backup ID for each backup for searching/retrieving backups at a later point.

In an embodiment, the backup data may be stored in encrypted form. The backup service may use a key management service 88 provided by the public cloud 12 to obtain keys to perform the encryption. In an embodiment, the key management service 88 may provide a plain text key and cipher text that corresponds to the key. The backup service 80 may provide the plain text key to the backup agent 84 to encrypt blocks, but may only store the cipher text with the backup data so that the key may be retrieved at a later point for decryption. Thus, the plain text key may only be available (and thus subject to exposure) for short periods of time while encryption or decryption is taking place. The key management service 88 may record which keys have been provided to which services in the public cloud 12, and may permit the data protection service 10 to obtain the key based on the cipher text because the key management service 88 previously provided the key to the data protection service 10 in response to a new key request. The data protection service 10 may receive a key ID in addition to the cipher text from the key management service 88 and may provide the key ID and cipher text (and an identifier associated with the data protection service 10 as well) to the key management service 88 at a later point to retrieve the plaintext key. The key management service 88 may be a protected service in the public cloud 12, and data protection service 10 may be required to register for credentials to use the key management service 88 in order to communicate with the key management service 88. Additionally, once credentials are provided and vetted, the key management service 88 may only provide previously-provided keys once the cipher text and other identifiers are verified.

As mentioned previously, the data protection service 10 may be multi-tenant. The services within the data protection service 10 may concurrently provide data protection for all organizations that have registered for data protection. For load balancing, a given service may internally start additional instances to improve parallel processing, and may delete the additional instances when the load decreases, as needed. However, the instances are not dedicated to particular organizations. Instead, each instance may handle the next event to be serviced, regardless of the corresponding organization, when the instance completes the processing of an event.

While the discussion of FIG. 5 uses virtual machines as an example, other embodiments may backup other types of data sets. For example, a file system 62 may have various logical volumes defined, or any other form of logical/structural organization in which the data is stored. Policies may be generated and applied to the volumes/other organizations and the scheduler service 72 may schedule backups based on the policies assigned to the file system structures. The backup service 80 and may coordinate with the backup agent 84 to back up the file system data. In a database embodiment, various databases hosted by the DB servers 50A-50B may have policies assigned to them so that backups may be scheduled and performed as well.

The various services within the data protection service 10 may communicate directly in various fashions, as illustrated by the arrows in FIG. 5 between services. Additionally, the task manager 99 may be provided to manage overall tasks and inform services of events that occur for a task to which the services may react. For example, a given backup of a virtual machine may be a task, and may be assigned a task ID. The scheduler service 72 may react to completion of the given backup, so that it may record the completion. The catalog service 78 may react to the completion by updating the catalog with a backup identifier corresponding to the given backup (which may be used to obtain object identifiers for the L1, L0, and/or L0MD structures created by the given backup from the backup service 80, e.g. for a restore operation). The task manager 99 may generally be responsible for managing the tasks, assigning task IDs and tracking events reported by the services with regard to the task.

It is noted that, while one instance of the local agent 26 is shown, a given site may deploy multiple instances of the local agent to increase parallelism of the backups from multiple virtual machines at a given site, as desired. In an embodiment, for example, multiple instances of the local agent 26 may be used to back up a given virtual machine that has multiple virtual disks. That is, each instance of the local agent 26 may back up a different virtual disk from the given virtual machine. The instances may operate independent of each other (e.g. they need not communicate nor coordinate their activities). Additionally, the local agents 26 may operate in response to instructions from the data protection service 10, and thus data protection service 10 may freely manage the local agents 26 to optimize backup operations. For example, instances of the local agents 26 may have different storage bandwidths. The data protection service 10 may take the available storage bandwidths into account when assigning backup tasks to local agents 26 (e.g. assigning larger backup data sets to local agents having higher storage bandwidths).

Backup Operation (FIGS. 6-13)

The data protection service 10 may produce various data structures to backup data from various organization sites. In one embodiment, the data structures created by the data protection service 10 include the structures shown in FIG. 6. The data structures may include a fingerprint database 100, backup data such as backup data 102A-102B, backup data descriptors such as the backup data descriptors 104A-104C, and backup metadata such as backup metadata 105A-105B.

A backup may be performed on a data set at the organization site. A data set may be any logical grouping of data. For example, a data set may be a virtual disk for a virtual machine, in an embodiment such as that shown in FIG. 2. A data set may be a database in an embodiment such as that shown in FIG. 3. A data set may also be a portion of a database, such as one or more tables from the database. A data set may be file system in an embodiment shown in FIG. 4. A data set may also be a volume of a file system, or any other logical or structural organization of data in the file system. The virtual disk will be used as an example in this discussion, but other data sets may be defined for other embodiments.

The data protection service 10 may define a data block for backup purposes (a "backup data block"). Each data set may be divided into multiple backup data blocks. The initial backup data block of the data set may be at logical offset zero in the data set, followed by a second backup data block beginning at the logical offset of the size of the backup data block, followed by a third backup data block at the logical offset of twice the size of the backup data block, followed by a fourth backup data block at the logical offset of three times the size of the backup data block, etc. That is, a data set may be sequential list of backup data blocks. The backup data block may be fixed in size (although backup data blocks in the actual backup data set stored for the backup may be compressed and thus may be variable in size in the stored data set). For example, the backup data block may be 16 kilobytes (kB) in size, for one embodiment. Other embodiments may use larger or smaller backup data blocks.

The data protection service 10 may use fingerprints corresponding to the backup data blocks for deduplication of backup data blocks, identifying the backup data blocks in the backup data descriptors, etc. A fingerprint may be a value which represents the content of the data block, and may be generated as a hash of the data block value. The fingerprint may have a high statistical likelihood of being unique to the data block (e.g. so-called nine-nines likely, or 99.999999999% likely). That is, there may be a small likelihood of a collision in which two different data blocks hash to the same fingerprint. However, in the absence of such a collision, a fingerprint may uniquely identify a corresponding data block value. Fingerprints may also be referred to as block tags, for example, because they are smaller values which still identify the larger data block value.

Fingerprints may be of any size, in various embodiments. For example, in one embodiment, a fingerprint for a 16 kB backup data block may be 40 bytes. Larger or smaller fingerprints may be used in other embodiments, even for the same size backup data block, as desired. The size of the fingerprint may be based on the hash operation that is performed to produce the fingerprint. That is, in the present example, the 16 kB block maybe hashed to 40 bytes.

The backup data descriptors 104A-104C may be another form of backup metadata, in addition to the metadata 105A-105B. That is, the backup data descriptors may describe the backup data. In an embodiment, backups may be incremental after an initial full backup is performed. Thus, the backup data 102A-102B actually captured at a given backup may include only the backup data blocks that have changed since a previous backup. Additionally, in an embodiment, the data protection service 10 applies deduplication of data. With deduplication, generally one copy of a backup data block is stored even though it may appear in multiple locations in the backup data sets captured over time (or even in multiple locations within a given backup data set). More particularly, in an embodiment, the data protection service 10 may perform deduplication across multiple sites of an organization, and thus one copy of the backup data block may be stored even though it may appear at multiple sites for the organization. In an embodiment, the data protection service 10 may employ deduplication across multiple organizations and thus one copy of the backup data block may be stored even though it may appear at sites belonging to multiple organizations. In each case, the backup data corresponding to a data set at a given point in time may not actually include all backup data blocks in the data set. The backup data descriptor may indicate the contents of the full data set. To actually obtain the full data set, multiple backup data sets captured at different times and/or from different sites or organizations may be consulted.

In the illustrated embodiment, the backup data descriptors may be a list of fingerprints identifying the backup data blocks that form the data set. The order of the fingerprints in the backup data descriptor is the logical order of the data blocks in the data set. The fingerprints may be used in conjunction with the fingerprint database 100 to locate the backup data blocks, which may reside in different backup data 102A-102B.

Figure 6:
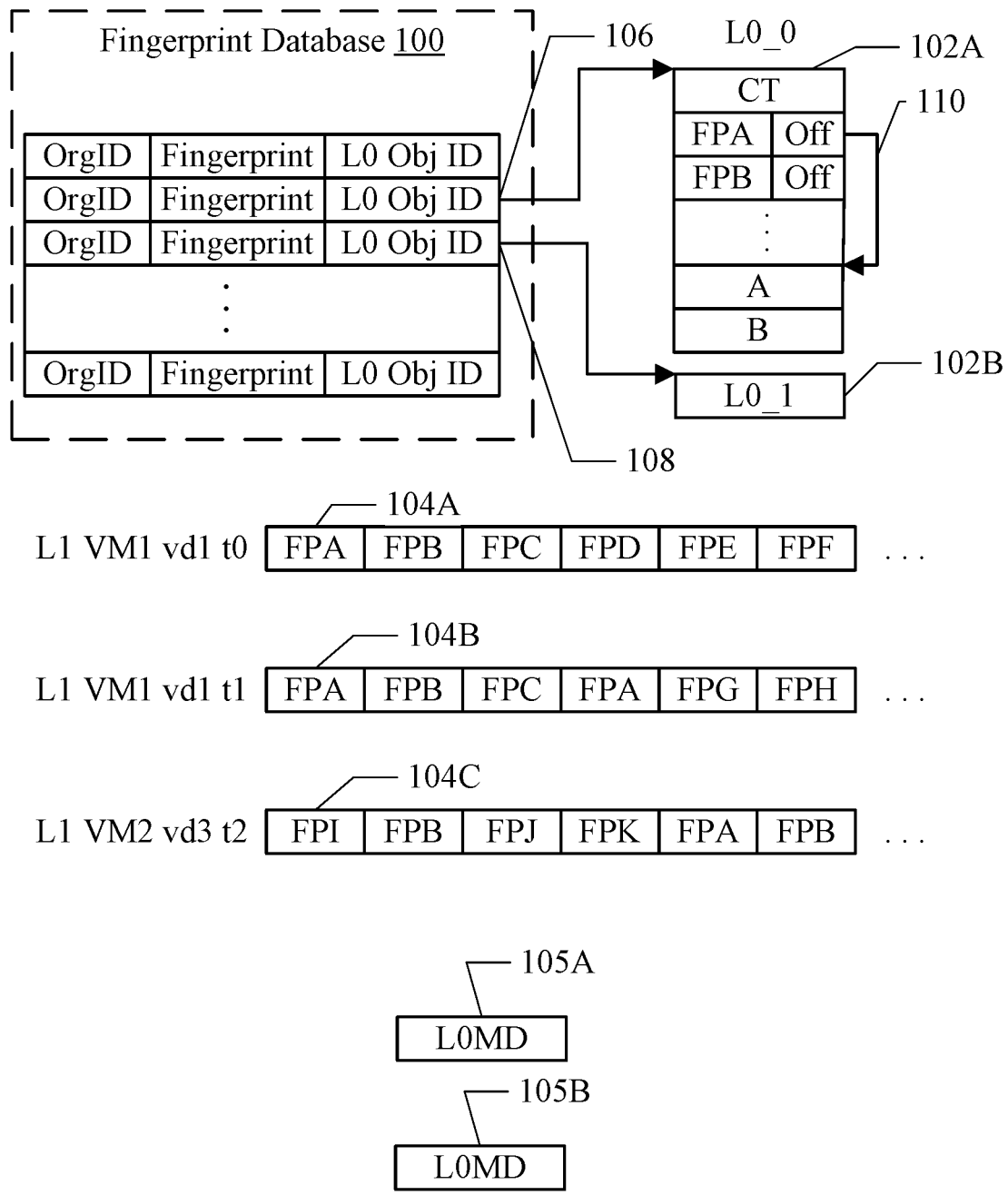
FIG. 6 illustrates an example of one embodiment of backup data structures generated by the data protection service.

For embodiments that are virtual machine-based, the data set may be a virtual disk associated with a given virtual machine. Thus, the backup data descriptors for the virtual machine embodiments may be descriptors for backups of virtual disks at particular points in time. In FIG. 6, the backup data descriptor 104A may correspond to a backup of VM1 vd1 (reference numeral 38A/40A in FIG. 2) at a time t0; the backup data descriptor 104B may correspond to a backup of VM1 vd1 at a different time t1; and the backup data descriptor 104C may correspond to a backup of VM2 vd3 (reference numeral 38C/40C in FIG. 2) at a time t3. The first fingerprint listed in each data descriptor may be logical offset 0 of the corresponding virtual disk, and subsequently listed fingerprints may correspond to increasing logical offsets within the virtual disk. While six fingerprints are shown for each data descriptor 104A-104C in FIG. 6, the ellipses indicate that there may be additional fingerprints. For example, for 16 kB backup data blocks and a 100 MB virtual disk, a corresponding data descriptor may include 6250 fingerprints (assuming the megabytes are measured in base 10 as is common in the storage industry, as opposed to base 2, i.e. 100 MB is 100,000,000 bytes).

The fingerprint database 100 may be used to implement deduplication of backup data across multiple sites of an organization and/or across multiple organizations and to locate deduped data blocks within the backup data maintained by the data protection service 10. The fingerprint data base 100 may include an entry for each fingerprint corresponding to a backup data block that is stored in the backup data 102A-102B maintained by the data protection service 10. The entry may store the fingerprint, and may store an object identifier (L0 Obj ID) to the backup data 102A-102B that stores the backup data block. For example, the entry 106 has an object ID for the backup data 102A, while the entry 108 has an object ID for the backup data 102B. Each entry in the fingerprint data base 100 may also store an organization identifier (OrgID) of the organization from which the backup data block was backed up. Organizations may choose whether to participate in cross-organization deduplication. For each organization that does not participate, it is possible that the same fingerprint may be present in an additional entry in the database 100 (e.g. up to one entry for each organization) and the corresponding backup data block may appear in more than one backup data 102A-102B. In another embodiment, the data protection service 10 may not implement cross-organization deduplication and thus each organization may have its own copy of a given backup data block in the backup data 102A-102B belonging to that organization.

Performing deduplication across multiple sites of an organization and/or across multiple organizations may result in even greater reduction in the amount of data stored overall by the data protection service 10. Since the data is stored in the public cloud 12, and there is an associated cost for storing the data, the reduced amount of data stored may lead to cost savings and efficiencies for both the owner of the data protection service 10 and the organizations that use the data protection service 10. It is noted that that fingerprint may be generated on the content of the data block before compression and encryption is performed on that data block. Thus, the fingerprint may be used to deduplicate against an L0 that may be compressed or encrypted using a different algorithm or an encryption key.

The backup data 102A is shown in more detail in FIG. 6, for an embodiment. In this embodiment, the backup data may be organized as a list of fingerprints for backup data blocks that are represented in the backup data, followed by the backup data blocks themselves. Each fingerprint may have an associated offset that locates the corresponding backup data block in the backup data 102A-102B (e.g. the offset for fingerprint A, or FPA, in FIG. 6 may point to the location of the backup data block A in the backup data 102A, as indicated by the arrow 110 in FIG. 6).

As mentioned previously, the backup data blocks may be compressed and encrypted in an embodiment. Thus, the backup data blocks stored in the backup data 102A-102C may have associated cipher text which may be used to identify the key that was used to encrypt the backup data blocks (e.g. the cipher text may be presented to the key manager service 88 to obtain the corresponding key). Additionally, in an embodiment, the data protection service 10 may support more than one compression algorithms and the backup data blocks may have an associated indicator identifying which compression algorithm was used. The CT field at the head of the backup data 102A may include the cipher text and/or compression identifier used for the data blocks of the backup data 102A.

In one embodiment, a given backup operation may result in more than one instance of the backup data 102A-102B. For example, the backup data 102A-102B may be assembled during a given backup up to a certain size, and then backup data 102A-102B may be stored to the public cloud 12 and another backup data 102A-102B may be started for the same backup. The maximum size of a given instance of backup data 102A-102B may be based on various efficiency considerations, both during the backup operation and after. For example, a full backup of a virtual disk would result in a copy of each backup data block in the virtual disk being stored locally at the organization site, in addition to the original copy, until the backup data 102A-102B is written to the object storage 90. For a large virtual disk, the amount of memory needed to store the copies prior to writing the full backup to the public cloud 12 may be excessive and may even exceed the capability of the data center. Assembling a portion of the backup data and writing it to the public cloud 12 while continuing to assemble additional backup data may reduce the local memory requirements. Additionally, the backup process for a given virtual disk may be performed as a pipeline of multiple processes: a process that assembles the backup data blocks, and another process that writes the assembled data to the public cloud 12. Generating multiple backup data 102A-102B (some of which may be written while others are assembled) may help keep the pipeline of processes concurrently busy. A given backup metadata 105A-105B may be a list of identifiers for the backup data 102A-102B that corresponds to a particular backup. For example, the identifiers may be object IDs for the backup data 102A-102B in the public cloud object storage 90.

The backup metadata 105A-105B may be used in a variety of ways. Prior to completing the update of the fingerprint database 100 with the fingerprints in a given backup, the backup metadata 105A-105B may be used to perform a restore from the given backup. That is, the fingerprints corresponding to backup data blocks that were captured in the backup data 102A-102B for a given backup are not yet represented in the fingerprint database 100 and thus a query for those fingerprints may not be found in the fingerprint database 100. The backup metadata 105A-105B may be used to locate the backup data 102A-102B, which may be scanned to locate the fingerprints. Additionally, even after the fingerprint database 100 has been updated (and thus the backup data blocks may be located via queries to the fingerprint database 100), it may be more efficient during a restore operation to first search the backup data 102A-102B for the backup (as identified by the backup metadata 105A-105B corresponding to the backup being restored), then querying the fingerprint database 100 for any remaining backup data blocks needed for the restore (if any).

In one embodiment, the fingerprint database 100 may be stored in block storage accessible to the data protection service 10 (e.g. the block storage 98a in FIG. 5). The backup data descriptors 104A-104C, the backup metadata 105A-105B, and the backup data 102A-102B may be objects stored in the object storage 90 in the public cloud 12. As mentioned previously, object storage 90 may be significantly less expensive than block storage in the public cloud 12, and thus storing the relatively large, relatively infrequently accessed backup data 102A-102B, backup metadata 105A-105B, and backup data descriptors 104A-104C in the object storage may be cost-effective. The frequently accessed fingerprint database 100 may be stored in the block storage for performance. In one embodiment, the fingerprint database 100 may be a DynamoDB available on the AWS public cloud. Other embodiments using different public clouds may have other databases.

For brevity in the remainder of this description, the backup data descriptors 104A-104C may be referred to as L1 data and the backup data 102A-102B may be referred to as L0 data, as illustrated in FIG. 6. The backup metadata 105A-105B may referred to as L0 metadata, or L0MD as illustrated in FIG. 6.

Figure 7:
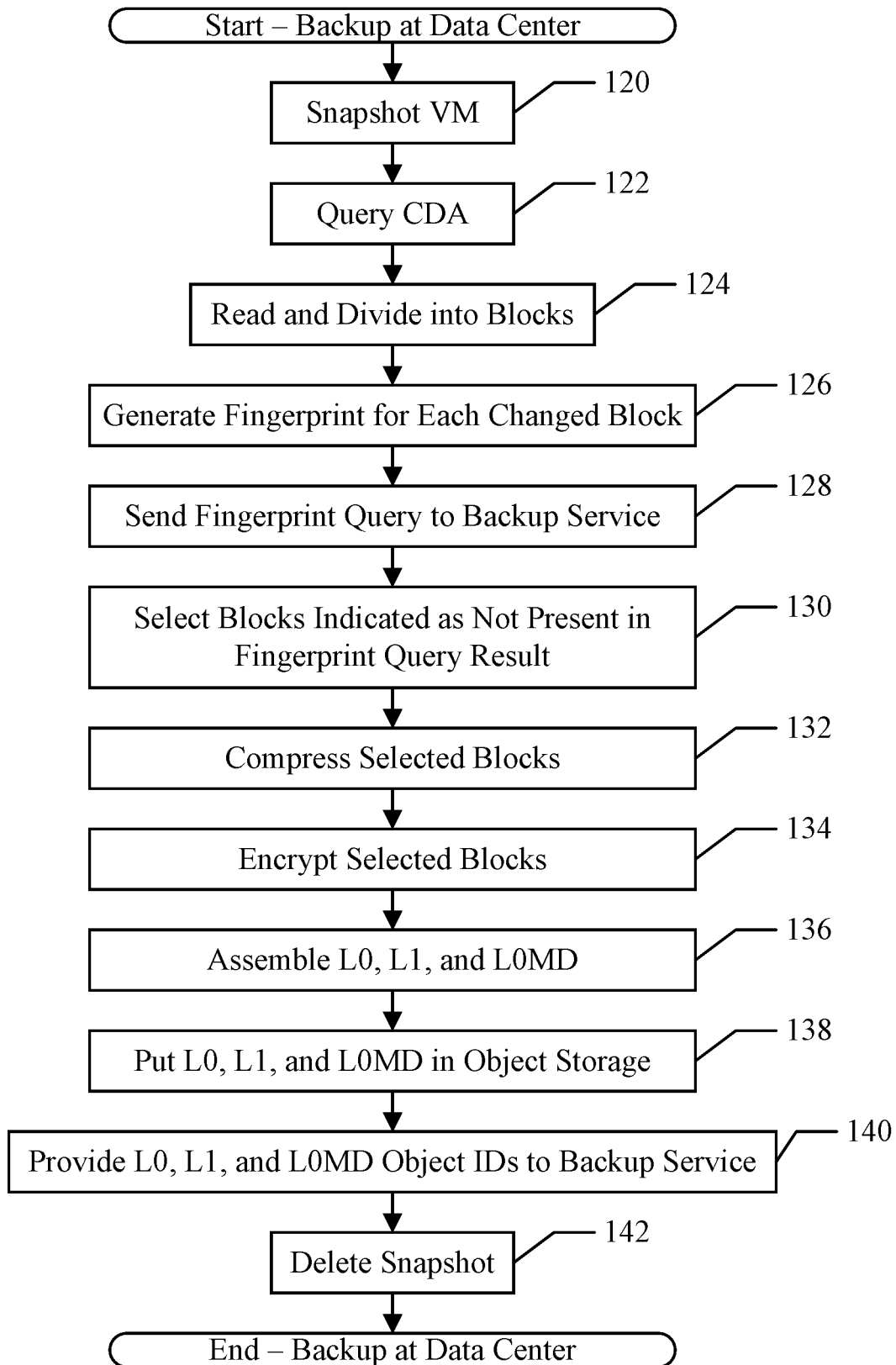
FIG. 7 is a flowchart illustrating operation of one embodiment of a backup agent in the data center to perform a backup.

FIG. 7 is a flowchart illustrating operation of one embodiment of the backup agent 84 in a data center to perform a virtual machine backup. In one embodiment, the backup agent 84 is stateless, and may perform the operation in FIG. 7 responsive to a series of commands issued by the backup service 80 through the message queues 94A-94B. In an embodiment, the backup and restore pipelines include checkpoints. If an agent 84 is restarted for any reason (e.g. due to an upgrade), the backup and restore operations may restart from the most recent checkpoint. The backup agent 84 may comprise instructions which, when executed on a computer in the data center, cause the computer to perform the operations illustrated in FIG. 7. The instructions may be responsive to the commands issued by the backup service 80.

Prior to the operation illustrated in FIG. 7, the IT professional for the data center may have registered with the data protection service 10. When the inventory of the data center was conducted and the virtual machine was discovered, a full backup was performed and change tracking was enabled for the virtual machine in the VC 32 (so that the portions of each virtual disk that have changed between backups may be determined).

The backup agent 84 may communicate with the VC 32 to cause a snapshot of the virtual machine to be taken (reference numeral 120). Snapshotting a virtual machine may generally include quiescing the virtual machine if it is in execution at the time that snapshot is requested, so that the state of the virtual machine is saved to the storage 24. The snapshot may then capture the state of the virtual disk(s) for the virtual machine, as well the configuration files that define the virtual machine. The virtual machine may resume execution once the snapshot is captured.

The backup agent 84 may query the change block tracking service in the VC 32 to determine which portions of the virtual disk have changed after the most recent backup (reference numeral 122). For example, in VMWare, a query changed disk areas (query CDA in FIG. 7, or even QCDA) may be supported to determine the changed area. Other virtual machine hypervisors may have a similar service. Furthermore, file systems and/or databases may employ change tracking as well. The change block tracking maybe performed on a different block size than the backup data block size used by the data protection service 10, in some embodiments. For example, the change block tracking may be performed at a disk sector granularity or disk block granularity, which may be larger than the backup data block size. In such a case, each changed block reported by the query may result in multiple backup data blocks. The backup agent 84 may process the result from the change block tracking service to determine which backup blocks within the virtual disk have changed and thus are to be backed up. The backup agent 84 may read the changed data from the virtual disk and divide the data into backup data blocks (reference numeral 124).

The backup agent 84 may generate a fingerprint for each changed backup data block, applying a hash function to the data. As mentioned previously, any hash function may be used (reference numeral 126). The backup agent 84 may transmit a fingerprint query including the fingerprints for the changed blocks to the data protection service 10 (reference numeral 126). More particularly, in an embodiment, the fingerprint query may be provided to the fingerprint query service 98, which may access the fingerprint database 100 in the storage 98a. The fingerprint query may be a list of fingerprints, for example. The fingerprint query service 98 may compare each fingerprint to the fingerprint database 100. If a matching fingerprint is detected in the fingerprint database 100, a copy of the backup data block is stored in previously backed up data and need not be captured again. Thus, matching fingerprints to the fingerprint database 100 may be used to implement deduplication in the present embodiment. The copy of the backup data block may have been captured from a different block location on the virtual disk, a different virtual machine, a different organization site, and/or a different organization, depending on the level of deduplication permitted by the organization. The fingerprint query service 98 may return a fingerprint query result to the backup agent 84, indicating whether or not each queried fingerprint is present or not present in the fingerprint database 100. The fingerprint query result may be a vector of present/not present indications, one indication for each fingerprint provided in the list transmitted with the fingerprint query. The present/not present indication may be a bit, for example, with the set state indicating present and the clear state indicating not present (or vice versa). Any indication may be used in various embodiments.

The backup agent 84 may select the backup data blocks for which the corresponding fingerprints were indicated as not present in the fingerprint query result, compress the blocks, and encrypt the blocks (reference numerals 130, 132, and 134). The commands from the backup service 80 which cause the backup agent 84 to perform the compression may include the plaintext key and corresponding cipher text provided by the key management service 88, and the backup agent 84 may use the plaintext key to encrypt the blocks. In an embodiment, multiple compression schemes may be supported. The backup agent 84 may select among the compression schemes in any desired fashion. For example, the backup agent 84 may attempt a first compression scheme, and if the amount of compression achieved is greater than a predetermined threshold, the result of the first compression scheme may be used. If the amount of compression achieved is not greater than the predetermined threshold, a second compression scheme may be attempted, until the supported schemes have been used or an amount of compression exceeds the threshold. In another embodiment, each compression scheme may be attempted and the result of the scheme that achieves the highest compression may be used. In still another embodiment, the data may be analyzed to predict which compression scheme will perform best on the data and the predicted scheme maybe used.

The backup agent 84 may assemble the L1 data, L0MD, and L0 data for the backup (reference numeral 136). More specifically, the backup agent 84 may provide a partially-populated L1, with the fingerprints for the backup data blocks that have been changed included at the offsets within the L1 that correspond to the respective backup data blocks. The portions of the L1 that correspond to unchanged backup data blocks may not be populated. For example, in an embodiment, valid fingerprints may be non-zero. That is, at least one bit in the bytes of fingerprint data may be set for any valid fingerprint. In such an embodiment, a fingerprint of all zero bytes may be provided in non-populated offsets in the L1. Alternatively, each offset may include a fingerprint and a valid indication (e.g. valid bit) indicating whether or not a fingerprint is present. Unpopulated offsets may have the valid indication set to invalid. The L0 may be a list of the fingerprints corresponding to the changed blocks, concatenated with the changed blocks themselves (more particularly, the compressed and encrypted changed blocks). Each fingerprint in the L0 may be augmented with an offset that points to the corresponding block in the L0. The header of the L0 include the cipher text corresponding to the key used to encrypt the block, an indication of the compression scheme used, etc.

The backup agent 84 may put the L0, L0MD, and L1 data in the object storage 90 of the public cloud 12 (reference numeral 138). A put may be an object write, and the writer (e.g. the backup agent 84 in this case) may assign an object ID and transmit the object ID to the public cloud 12 with the object. For example, the object ID may be referred to as a key in the AWS public cloud, and the object itself is the value associated with the key. The backup agent 84 may thus assign a unique object ID to each object that it puts in the public cloud 12. The backup agent 84 may have any mechanism to assign object IDs. For example, the backup agent 84 may assign a unique file ID to each virtual disk being backed up. The file ID may be different each time the virtual disk is backed up, and may be unique among file IDs assigned to the same organization. In an embodiment, the file ID may be appended with other known data to generate each object ID, so that both the backup agent 84 and the backup service 80 may be able to generate the object ID, both during the backup operation and at later points such as when a restore is desired. The backup service 80 may store the file IDs in the backup database on the storage 80a, along with a backup ID that identifies the particular backup. Alternatively, object IDs may be stored in the backup database on the storage 80a for later retrieval. The public cloud 12 may return a success/fail result to indicate that the object has been successfully stored in the object storage 90. The actual location in the object storage 90 (and the manner of storage, e.g. replication of data, etc.) may not be known outside the public cloud 12, but a get using the key from an entity that put the object in the object storage 90 may be use to return the object.

The backup agent 84 may provide the L0, L1, and L0MD object IDs to the backup service 80 (reference numeral 140). Alternatively, the backup agent 84 may provide the file ID for the backup, from the which the backup service 80 may generate the object IDs. Once the backup agent 84 provides the object IDs or file ID, the backup may be complete from the point of view of the organization. The backup agent 84 may indicate to the VC 32 that the VM snapshot may be deleted (reference numeral 142). In an embodiment, various post-processing may be performed by the backup service 80 as discussed in more detail below to fully complete the backup.

As mentioned previously, the backup agent 84 may comprise multiple processes operating in parallel to perform the various operations illustrated in FIG. 7. Thus, for example, blocks may be compressed and encrypted in parallel with assembling the previously encrypted data blocks into an L0. Once the L0 reaches a predetermined size, the L0 may be put to the object storage and the object ID may be captured in the L0MD. The L1 and L0MD may be put once the backup is complete. Accordingly, a given backup may result in one or more L0s, one L1, and one L0MD in this embodiment. The maximum size of the L0 may be measured in terms of number of backup data blocks or in terms of actual storage amount, which may be a variable number of backup data blocks depending on how successful the compression of each backup data block is.

Figure 8:
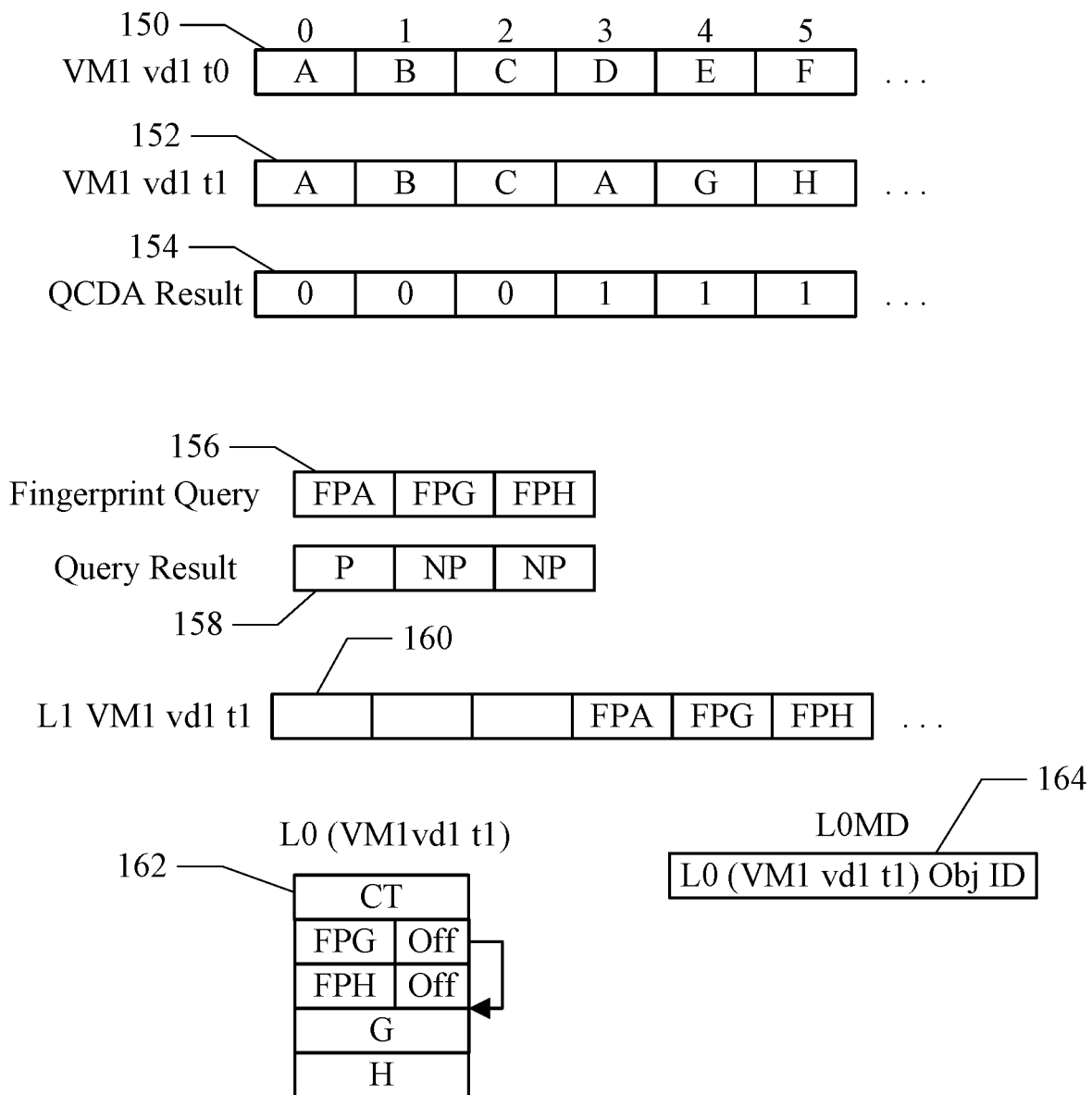
FIG. 8 is an example of data generated by one embodiment of the backup agent.

FIG. 8 is an example of a backup for VM1 virtual disk 1 (vd1) at a time t1, for one embodiment. Exemplary backup data blocks in vd1 for block offsets 0 through 5 at a preceding backup time t0 are shown (reference numeral 150), as well as the backup data blocks in those same offsets at time t1 (reference numeral 152). The letters used to represent the blocks represent the content of the block (e.g. letter A indicates a first content, letter B indicates a second content that is different from the first content, etc.). If the same content appears in different blocks, the same letter is used for those blocks.

As FIG. 8 illustrates, the backup data blocks at offsets 0, 1, and 2 are unchanged between time t0 and t1 (i.e. blocks A, B, and C). The blocks at offsets 3, 4, and 5 have changed between t0 and t1. Particularly, the block at offset 3 has changed from D to A. That is, the block at offset 3 now has the same content as the block at offset 0. The blocks at offsets 4 and 5 have changed from E and F at time t0 to G and H at time t1. The QCDA result at time t1 is 0 for blocks at offsets 0, 1, and 2 (indicating unchanged) and 1 for blocks at offsets 3, 4, and 5 (indicating changed) (reference numeral 154). In other embodiments, 1 may indicate unchanged and 0 may indicate changed in the QCDA results.

For the portion of vd1 illustrated in FIG. 8, there are three changed blocks and so the fingerprint query includes three fingerprints: FPA generated from block A, FPG generated from block G, and FPH generated from block H (reference numeral 156). If there are more changed blocks in the remainder of vd1 (not shown in FIG. 8), those fingerprints would be included in the fingerprint query as well. Multiple fingerprint queries for portions of the virtual disk may be used to support pipelining of the operations performed by the backup agent 84 as mentioned above.

In the example, the query result indicates present for FPA (reference numeral A, which was backed up at least at time t0 if not at some preceding time from vd1 or a different virtual disk/virtual machine). The results for fingerprints FPG and FPH indicate not present. Present is illustrated as a P in the query result 158, and not present is illustrated an NP. In an embodiment, present may be indicated by a set bit and not present may be indicated by a clear bit, or vice versa. It is noted that, while block A is duplicated in the vd1 virtual disk itself, a given block may be indicated as present (and thus deduplicated) if it is a duplicate of a block from a different virtual disk at the same site, or a different site from the same organization, or even a different organization, in some embodiments.

The backup agent 84 generates a partially-populated L1 including the fingerprints FPA, FPG, and FPH in at offsets 3, 4, and 5. The first three offsets (0, 1, and 2) are not populated since those blocks were unchanged between time t0 and time t1. The L0 data (reference numeral 162) includes the fingerprints FPG and FPH, and the blocks G and H, since block A is present in previous backup data.

The backup agent 84 may also generate the L0MD 164 for the backup. In this case, one L0 162 was generated and thus the L0MD 164 may include one object ID for the L0 162. In other cases, in which more than one L0 object is generated for a given backup, the L0MD 164 would include additional object IDs for the other L0 objects.

Figure 9:
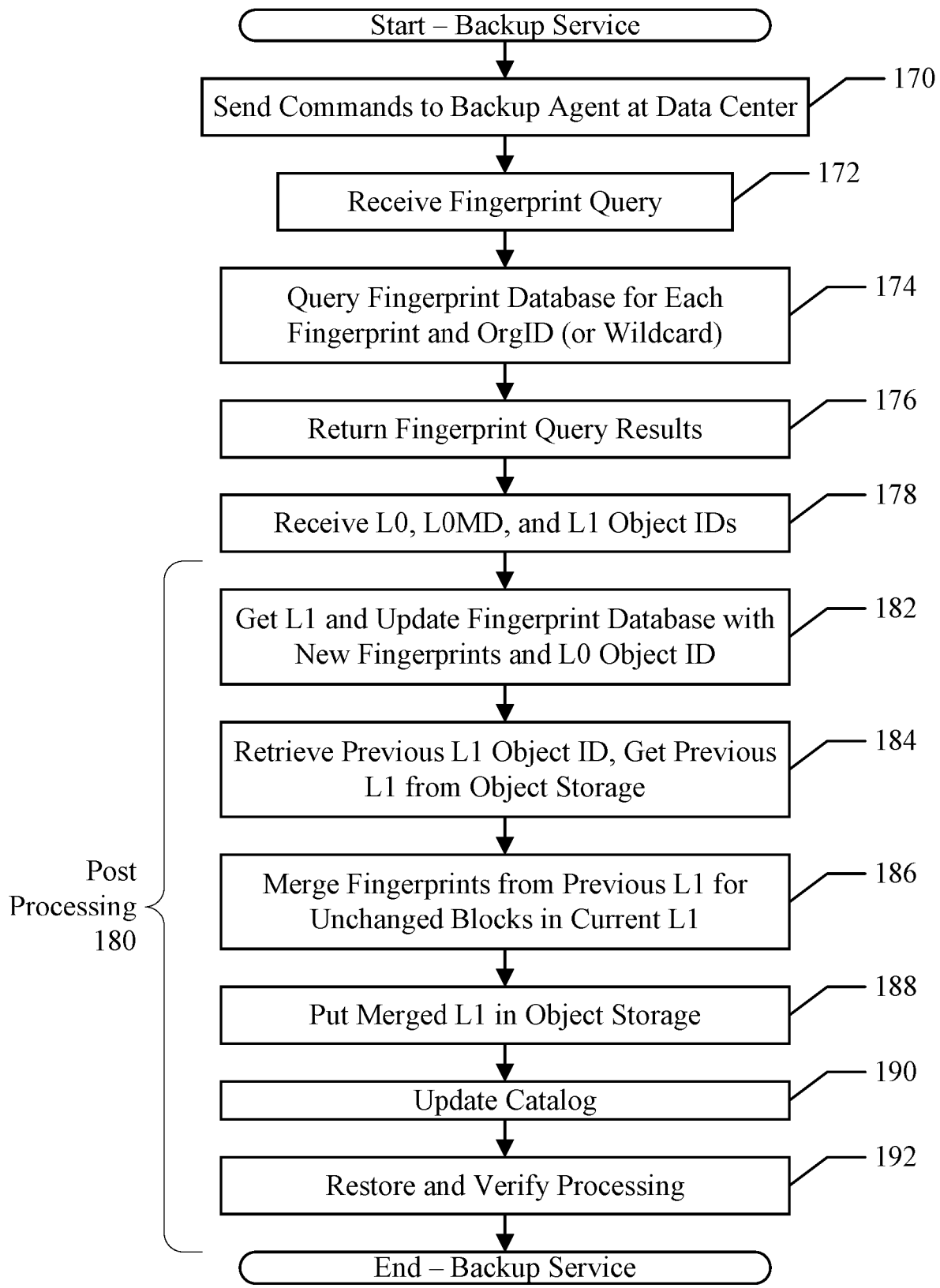
FIG. 9 is a flowchart illustrating operation of one embodiment of the backup service to perform a backup.

FIG. 9 is a flowchart illustrating operation of one embodiment of the backup service 80 (and certain related services, in an embodiment) to perform a backup of a virtual machine from the data center of an organization (or any other data set, such as file systems or portions thereof, or databases or portions thereof, in other embodiments). The backup service 80 may include instructions which, when executed on a computer in the public cloud 12, cause the computer to perform operations as illustrated in FIG. 9.

As mentioned above, in an embodiment, the backup agent 84 may respond to a series of commands from the backup service 80 to perform the portion of the backup that occurs in the data center. The backup service 80 may issue the commands (reference numeral 170). The issuance of the commands may occur in parallel with other operations illustrated in FIG. 9. That is, not all of the commands need be issued at the start of the backup. The commands may be issued in batches. For example, in some cases, commands may be issued up to a point at which the backup agent 84 may transmit a communication to the backup service 80 (e.g. the fingerprint query). Alternatively, the commands may be issued and completed individually, or there may be respective groups of commands that implement each operation in FIG. 7 that may be issued and completed as groups, in parallel with the operation shown in FIG. 9.

The fingerprint service 98 may receive a fingerprint query from the backup agent 84 (reference numeral 172) and may query the fingerprint database 100 for each fingerprint (reference numeral 174). The query may include the organization identifier for the organization that owns the site from which the backup is being performed, if the organization does not participate in cross-organization deduplication.

Alternatively, the query may be "wild carded" if the organization does participate in cross-organization deduplication, such that a match on the fingerprint may be detected for an entry in the fingerprint database 100 if the fingerprints match, even if the organization identifier is for a different organization.

As previously mentioned, the data protection service 10 may be multi-tenant and thus fingerprint database queries may be received from multiple organizations concurrently. Additionally, organizations that have multiple sites may be transmitting queries from the various sites concurrently, and/or multiple backups occurring at a given site may transmit queries. The data protection service 10 may attempt to load balance the queries and dynamically add instances within the fingerprint query service 98 to manage the load. However, in some cases, the number of queries and fingerprints within the queries may be larger than may be managed. In an embodiment, the fingerprint query service 98 may query the fingerprint database 100 for a subset of the fingerprints in a query, and report "not present" for the fingerprints that are not queried. If the fingerprints that are not queried are in fact present, a correct result may still be achieved but there may end up being more than one copy of the corresponding data block in the backup data maintained by the data protection service 10 (i.e. the deduplication may not be as complete as it could otherwise be). In an embodiment, a history of how frequently a given organization, site, or virtual machine has receive "present" results for queries may be used to determine how large a subset to select from a given fingerprint query (e.g. higher percentages of "present" results in queries may indicate that a larger subset of a current query should be selected since duplication is frequently detected).

The fingerprint query service 98 may return the fingerprint query results (reference numeral 176). Subsequently, the backup service 80 may receive the L0, L0MD, and L1 object IDs (or the file ID for the corresponding virtual disk) from the backup agent 84 (reference numeral 178). As mentioned previously, once the L0, L0MD, and L1 data has been stored (put) to the object storage 90 in the public cloud 12 and the backup agent 84 has delivered the object IDs/file ID for the objects to the backup service 80, the backup may be complete from the point of view of the organization. That is, a recovery from the backup may be possible at any time after the backup is complete, even if the backup post processing performed in the public cloud 12 by the data protection service 10/backup agent 80 is not complete. The remainder of the flowchart in FIG. 9 may thus be backup post-processing (indicated by brace 180).

The backup postprocessing may include updating the fingerprint database 100 with the fingerprints of the blocks captured in the backup. The backup service 80 may get the L1 from the object storage 90 using the L1 object ID (reference numeral 182). A get may be a read from the object storage 90, and may include the object ID of the object being read. The object storage 90 may return the object associated with that object ID and entity. The backup service 80 may scan the partially-populated L1 to identify new fingerprints. That is, the fingerprints in the partially-populated L1 may be compared to the fingerprint database 100 (with or without OrgID, depending on the level of deduplication permitted by the organization) to identify which fingerprints identify new data blocks. In an embodiment, the backup service 80 may transmit a fingerprint query to the fingerprint query service 98 to identify which fingerprints correspond to the new data blocks. In the example of FIG. 8, fingerprint FPA is included at offset 3 because the data block at that offset changed, but that fingerprint is already included in the fingerprint database 100 and thus is not added (and there is no data for block A in the L0 data provided by the backup agent 84, either). The new fingerprints and OrgID may be inserted into the fingerprint database 100, along with the object ID for the L0 data object that contains the corresponding block of data (reference numeral 182). As mentioned previously, there may be multiple L0 data objects for a given backup. In an embodiment, the backup service 80 may be get the L0 data objects from the object storage 90 as well, and may scan the L0 objects for a given fingerprint to identify which L0 object ID to associate with the fingerprint. In the example of FIG. 8, fingerprints FPG and FPH may be added to the fingerprint database 100 in this fashion, with the object ID for the L0 162. It is noted that, because the data protection service 10 is multi-tenant and backups from multiple sites and/or organizations may be proceeding concurrently, it is possible that a fingerprint that was not represented in the fingerprint database 100 when the fingerprint query was transmitted by the backup agent 84 will be represented at the time the backup is completed (e.g. inserted due to completion of a concurrently-running backup). Such fingerprints may appear to be duplicates when updating the fingerprint database 100, and thus may not be added similar to fingerprint FPA in the example of FIG. 8.

The backup postprocessing may include merging the L1 data from a previous backup with the partially-populated L1 provided by the backup agent 84 to provide a complete L1 for the backup. In other embodiments, the backup agent 84 may provide a complete L1 and the merge may not be required. However, permitting the backup agent 84 to provide a partially-populated L1 may allow for the backup agent 84 to avoid generating fingerprints for data blocks that have not changed, which may improve efficiency.

The merging of the L1 data is illustrated via blocks 184, 186, and 188 in FIG. 9. The backup service 80 may communicate with the catalog service 78 to obtain a backup ID for the most recent backup of the same virtual machine, and may map the backup ID to an object ID to the previous L1. That is, the backup service 80 may maintain the backup database in the storage 80a, and may use the backup ID to locate the file ID for the previous backup, from which the object IDs may be derived. Alternatively, the object IDs may be stored in the backup database. In other embodiments, the catalog may store the L1, L0MD, and L0 object IDs directly. The backup service 80 may get the previous L1 from the object storage 90 using the object ID (reference numeral 184). The backup service 80 may replace each invalid fingerprint in the partially-populated L1 for the current backup with the fingerprint from the corresponding offset in the previous L1, merging the fingerprints for the unchanged blocks to create the complete L1 for the current backup (reference numeral 186). The backup service 80 may put the complete L1 back to the object storage 90, overwriting the partially-populated L1 with the complete L1 (reference numeral 188).

The backup service 80 may transmit an update to the catalog service 78 (reference numeral 190), providing the backup ID and other identifying information for the backup (e.g. the virtual machine name, site identifier if applicable, organization identifier, etc.). The catalog service 78 may record the information along with the date and time of the backup.

The backup service 80 may also restore the backup to verify the contents of the backup, and perform other verification processing such as security scans (reference numeral 192). An embodiment of the restore and verify processing is shown in greater detail in FIG. 10. Once the restore and verify processing is complete, the backup postprocessing 180 implemented by the backup service 80 is complete for this embodiment.

Figure 10:
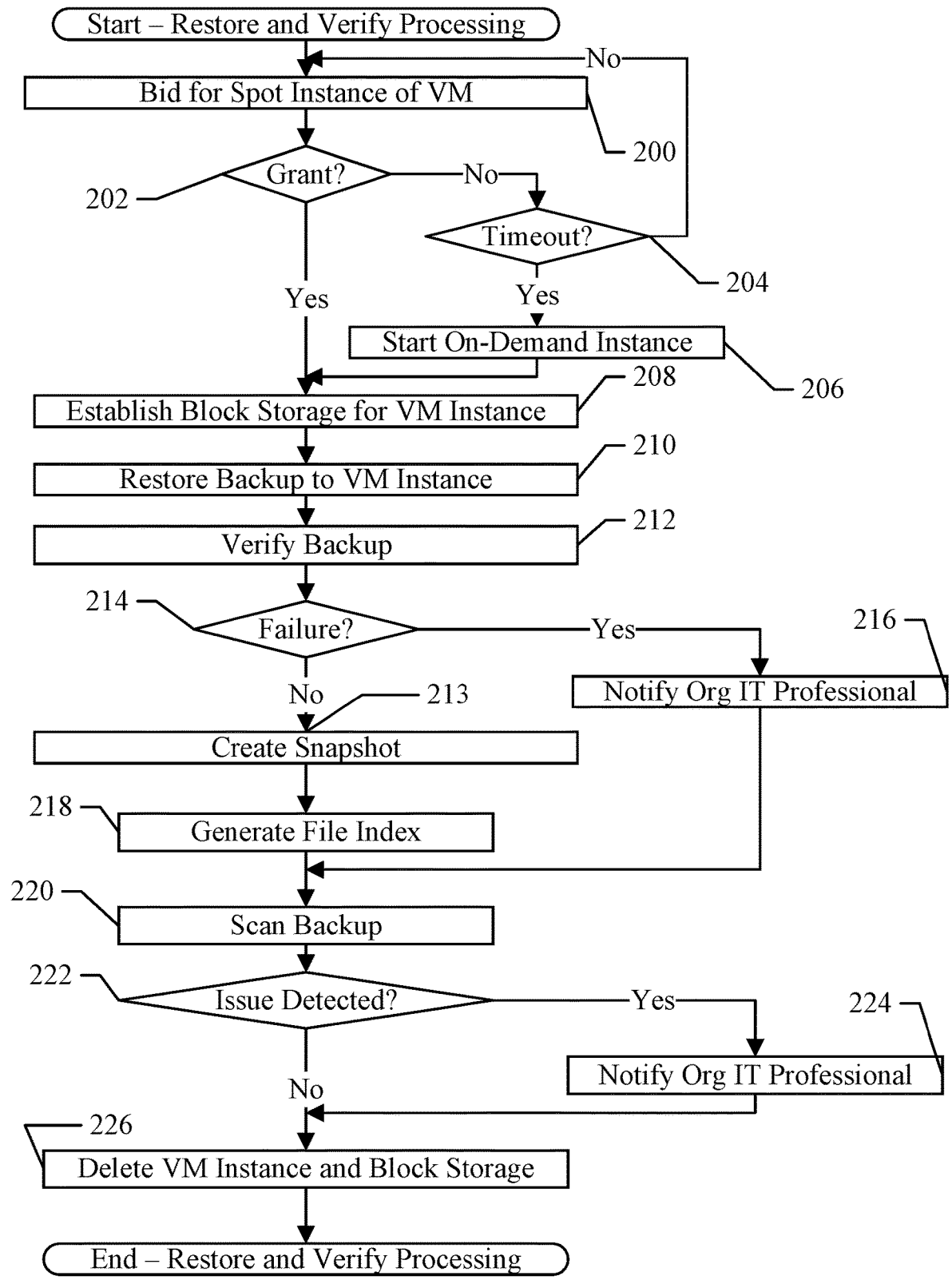
FIG. 10 is a flowchart illustrating operation of one embodiment of the "restore and verify" block in FIG. 9.

FIG. 10 is a flowchart illustrating the restore and verify processing performed by one embodiment of the backup service 80 (reference numeral 192 in FIG. 9). The backup service 80 may include instructions which, when executed on a computer in the public cloud 12, cause the computer to perform operations as illustrated in FIG. 10.

The public cloud 12 includes significant computing resources, and at times those resources are not in use. The public cloud 12 may support a bidding process to claim computing resources that are not being used at a (potential) discount to the on-demand price charged when a computing resource is needed with certainty. The backup service 80 may attempt to make use of the bidding process to obtain an instance of a virtual machine for the restore and verify process. The instance obtained through the bidding process is referred to as a spot instance of the virtual machine, as compared to the on-demand instance that is provided at a fixed price.

The backup service 80 may bid for a spot instance of a virtual machine (reference numeral 200), and if not granted (decision block 202, "no" leg) may continuing bidding up to a timeout period expires (decision block 204, "no" leg). If the timeout period expires without the grant of a spot instance (decision block 202, "no" leg and decision block 204, "yes" leg), the backup service 80 may start an on-demand instance (reference numeral 206). On the other hand, the bid may be successful and the spot instance may be granted before the timeout expires (decision block 202, "yes" leg), in which case the spot instance may be used. The timeout period may be selected as any amount of time. In an embodiment, for example 3 minutes may be used. However, longer or shorter timeouts may be implemented in other embodiments. When bidding for a spot instance, a length of time that the spot instance may be held is also specified. The length may be selected to ensure that the restore and verify processing will be completed before the spot instance expires. For example, a multiple of the expected time to perform the processing may be used. In an embodiment, the charge for the spot instance may be based on the amount of time actually used, not the amount of time that was bid for. However, a longer length of time specified in the bid may reduce the likelihood that the bid is successful.

Once the spot or on-demand VM instance is started, the backup service 80 may establish a block storage for the VM instance that is large enough to accommodate the backed-up virtual disk (reference numeral 208). The backup service 80 may load code into the VM instance to perform the restore and verification process, in an embodiment. The code in the VM instance may begin execution by restoring the backup to the VM instance (and more particularly to the block storage established for the VM instance) (reference numeral 210). The restore process is illustrated in greater detail in FIG. 11 and described below. In one embodiment, if there is a snapshot of a previous backup available, the snapshot may be instantiated in the block storage and the changed blocks from the backup may be restored to the snapshot. Restoring the snapshot and the changed blocks may take less time than restoring the backup completely. The code may verify the restored backup (reference numeral 212). For example, the code may generate the fingerprints for each backup data block in the block storage and compare the fingerprint to the corresponding fingerprint from the L1. If a failure is detected in the backup (decision block 214, "yes" leg), the data protection service 10 may transmit a message to the IT professional at the organization from which the backup was taken. For example, the VM instance may generate an email and transmit it to the IT professional (reference numeral 216). In another example, the notification may be transmitted through the UI backend 92 to the UI server 93, which may display the notification for the IT professional in the UI. A text message may be sent to the IT professional's mobile phone. A log file may be updated to indicate the failure. Any set of one or more notifications may be used to communicate the failure to the IT professional. If no failure is detected, the VM instance may create a snapshot of the backup (reference numeral 213). A snapshot may be a feature of the public cloud 12, and may be less costly than block storage. Accordingly, snapshots may be used to reduce cost and to provide greater efficiency if a subsequent restore is performed. The VM instance may scan the files on the virtual disk and generate a file index for the files on the virtual disk (reference numeral 218). The VM instance may put the file index in the object storage 90, and may associate the object ID to the file index with the backup ID for the current backup (e.g. in the backup database). Alternatively, in embodiments that store the object IDs in the catalog, the VM instance may provide the object ID to the file index to the catalog service 78 to be stored with the other data describing the backup. In still another embodiment, the object IDs to the file indexes may be associated with OrgID and virtual machine name. A backup ID may be provided when the version of the file is selected.

The code loaded into the VM instance may also include one or more security scanning applications (e.g. a virus scanner, ransomware scanner, malware scanner, PII scanner, etc.). The VM instance may execute the scanners to scan the backup for various security threats (reference numeral 220). Alternatively, one or more of the scanners may be a public cloud 12 service or may by implemented separate from the VM instance. If so, the VM instance may provide access to the backup to perform the scans. In some embodiments, the VM instance may scan the backup for likely candidates (e.g. specific files) to be scanned and provide the candidates to the external scanners. If one or more of the scanners detects an issue (decision block 222, "yes" leg), the data protection service 10 may generate a message notifying the organization's IT professional (reference numeral 224). Once the scanning is complete, the backup service 80 may delete the VM instance and the block storage attached thereto, which may terminate the charges accruing for use of the VM instance (whether spot or on-demand) and the block storage (reference numeral 226).

For embodiments that implement other data sets, similar post processing may be performed, but may not necessarily be in the context of a virtual machine. For example, a file system backup may be restored to a block storage, verified, snapshotted, file indexed, and scanned by security scanning applications as in reference numerals 208, 210, 212, 214, 213, 216, 218, 220, 222, and 224. Then block storage may be deleted subsequent to the completion of the post processing. Similarly, a database backup may be restored to a block storage, verified, and snapshotted as in reference numerals 208, 210, 212, 214, 213, and 216.

Figure 11:
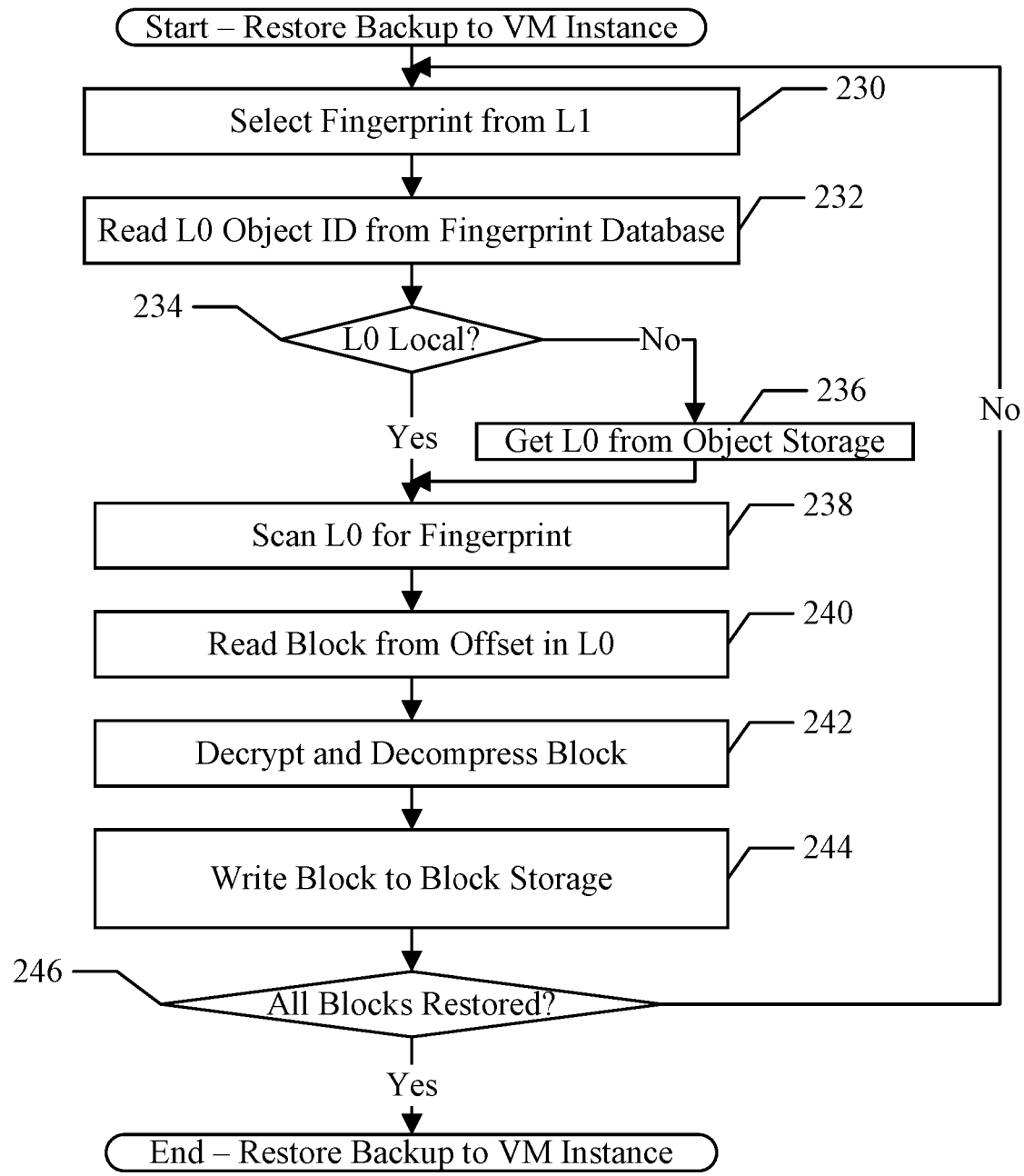
FIG. 11 is a flowchart illustrating operation of one embodiment of the "restore back to VM instance" block in FIG. 10.
Figure 14:
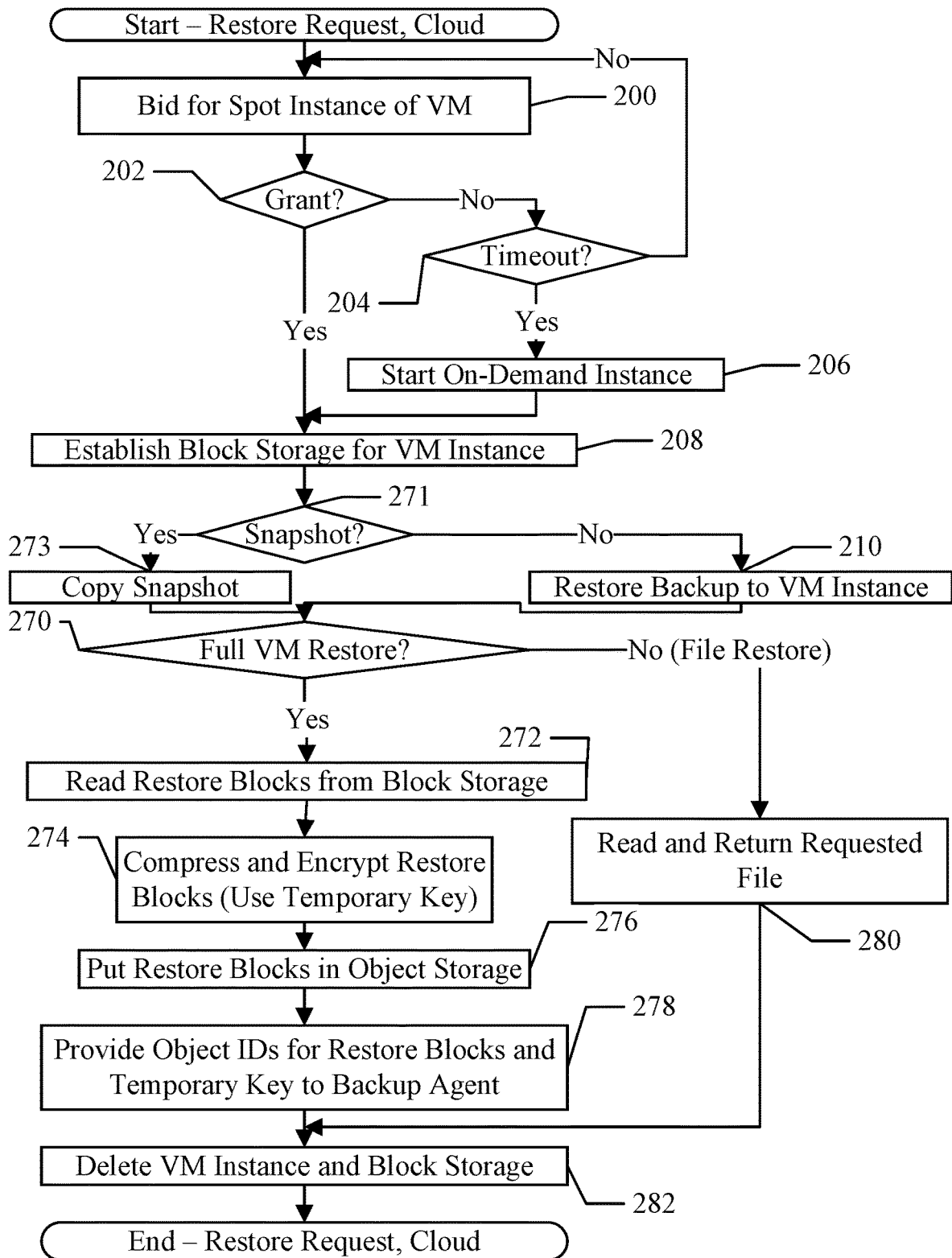
FIG. 14 is a flowchart illustrating operation of one embodiment of a backup service for performing a restore from a backup to the data center.

FIG. 11 illustrates the restore of a backup to a VM instance (reference numeral 210 in FIG. 11, and also reference numeral 210 in FIG. 14). The backup service 80 may include instructions which, when executed on a computer in the public cloud 12, cause the computer to perform operations as illustrated in FIG. 10. The instructions may be loaded by the backup service 80 into a VM instance to be executed in the VM instance to perform the illustrated operations, in an embodiment. For other types of data sets, similar operation may be performed to process the fingerprints from the L1 of the backup to locate corresponding backup data blocks, but not necessarily in a VM instance.

The VM instance may select a fingerprint from the L1 for the backup (reference numeral 230). The initial selected fingerprint may be the fingerprint at offset zero of the L1, corresponding to the backup data block at logical offset zero of the virtual disk, and the restore process may progress sequentially through each logical offset until each backup data block of the virtual disk has been restored. The L1 may be provided to the VM instance by the backup service 80, since the backup service 80 may have a copy of the L1 from performing the L1 merge. Alternatively, the VM instance may be provided with an object ID for the L1 in the object storage 90 and may get the L1 from the object storage 90. The VM instance may transmit the fingerprint to the fingerprint query service 98 to access the fingerprint database 100 (along with the OrgID for the organization, if the organization does not participate in cross-organization deduplication). The fingerprint database 100 may return the object ID to the L0 data structure that contains the corresponding backup data block (reference numeral 232). If the VM instance does not have a local copy of the L0 data structure (e.g. because the L0 has not been previously accessed during the restore for another backup data block—decision block 234, "no" leg), the VM instance may use the L0 object ID to get the L0 from the object storage 90 (reference numeral 236). If the L0 is already local (decision block 234, "yes" leg), the L0 need not be obtained from the object storage 90.

In either case, the VM instance may scan the initial portion of the L0 to locate the fingerprint (reference numeral 238), and obtain the corresponding offset to the backup data block. The VM instance may read the backup data block from the offset within the L0 (reference numeral 240), and may decrypt and decompress the backup data block (reference numeral 242). The VM instance may use the cipher text associated with the backup data block in the L0 data structure to request the plaintext key from the key management service 88 to perform the decryption. The VM instance may write the decrypted, decompressed block to the block storage at the current offset (reference numeral 244). If all blocks of the virtual disk have not yet been restored (decision block 246, "no" leg), the VM instance may select the next sequential fingerprint and continue the processing (reference numeral 230 and following as illustrated in the flowchart). Once all the blocks have been restored (decision block 246, "yes" leg), the backup is restored to the VM instance and further processing may be performed.

The above discussion describes a restore using the FP database 100 for each fingerprint to locate the corresponding backup data block in an L0 data structure. In an embodiment, if there is an L0MD data structure available for the backup, the VM instance may scan the L0 data structures identified by the L0MD data structure for the fingerprint prior to transmitting the fingerprint to the fingerprint database. If a match is found, the VM instance may read the backup data block and proceed to process the backup data block as discussed above (reference numerals 242 and 244). If the fingerprint does not match in the L0 data structures located by the L0MD, the FP database 100 may be consulted to locate the L0 data structure (reference numerals 232, 234, 236, and 238).

Figure 12:
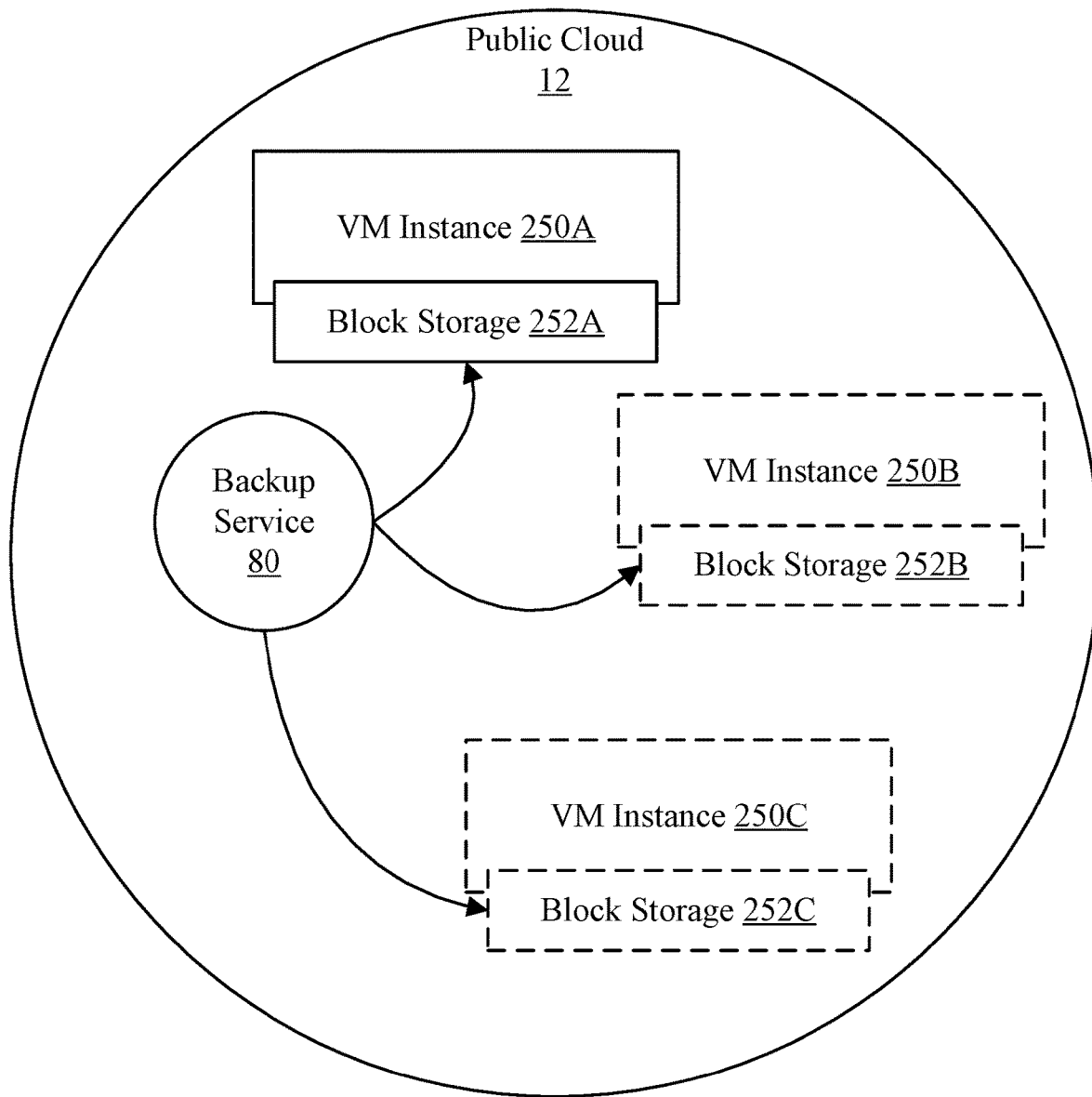
FIG. 12 is a block diagram illustrating scalability by launching multiple virtual machines when multiple backups are completing, for an embodiment.

As mentioned previously, employing a cloud-based data protection solution may permit the elastic expansion and contraction of resources as needed to scale the data protection service across multiple backup sets (e.g. virtual machines) from a site, multiple sites, and/or multiple tenants. The expansion and contraction may include load balancing within a service by starting additional instances of the service. Additionally, the establishment of VM instances to perform backup verification and other post processing operations such as file index operations, etc. may be scalable. Any number of VM instances may be started to perform the desired operations, and then the instances may be deleted once the post-processing is complete. FIG. 12 illustrates the backup service 80 executing in the public cloud 12, with a VM instance 250A with corresponding block storage 252A to verify a backup data set. If additional backup data sets are ready to be verified, the backup service 80 may start additional VM instances such as instances 250B-250C, with block storages 252B-252C, to verify the backup data sets in parallel and independently.

Figure 13:
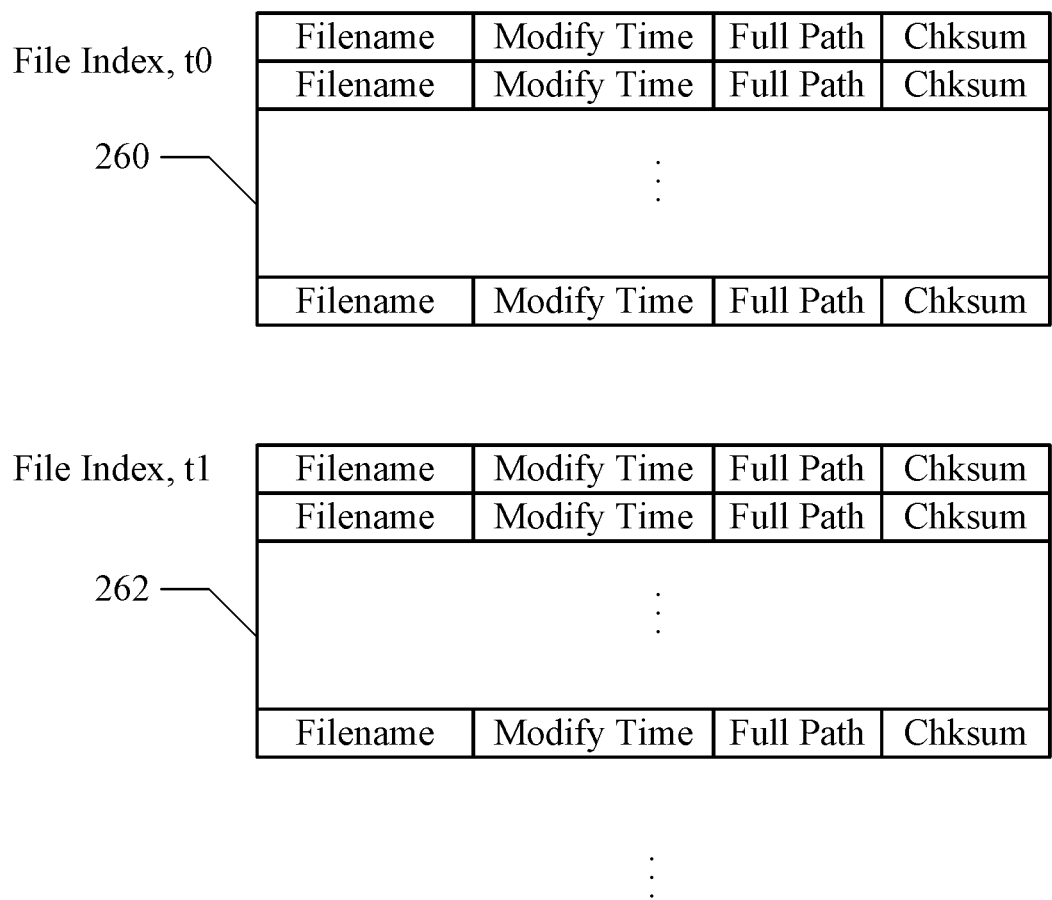
FIG. 13 is a block diagram illustrating one embodiment of file index data.

FIG. 13 is an example of file indexes that may be generated for virtual disk backups at various points in time, for an embodiment. Illustrated in FIG. 13 is a file index 260 for a backup of a virtual disk at time t0, and another file index 262 for a backup of the virtual disk at a time t1. Similarly, file indexes may be generated from file system backups (or portions of the file system, such as a volume). Additional file indexes for other points in time may also be generated. The file index may include a filename, a timestamp indicating the time at which the file was most recently modified ("Modify Time"), a full path name for the file in the directory structure of the virtual disk, and a checksum computed over the contents of the file ("Chksum"). The checksum field may be used to search for a file by content rather than by filename.

The file indexes 260 and 262 may use a Parquet format sorted by filename. The Parquet format is defined as part of the Apache server, and is a well-known open-source column-oriented data format for storing data for efficient write. Optimizing the file indexes for write may be desired since the file indexes may be written for each backup (and there may be numerous files in a given backup, e.g. on the order of millions of files), which is a frequent occurrence. On the other hand, the file indexes may only be read when a file-level restore is desired, an infrequent occurrence.

When a file-level restore is desired, the file indexes may be searched in parallel using multiple threads (e.g. one thread per file index) performing a binary search on each file index to locate a desired file name. The public cloud 12 may support a search thread service that may be used for this purpose. For example, in the Amazon AWS public cloud, Athena is a serverless interactive query service that may conduct searches using standard structured query language (SQL) searches.

Figure 15:
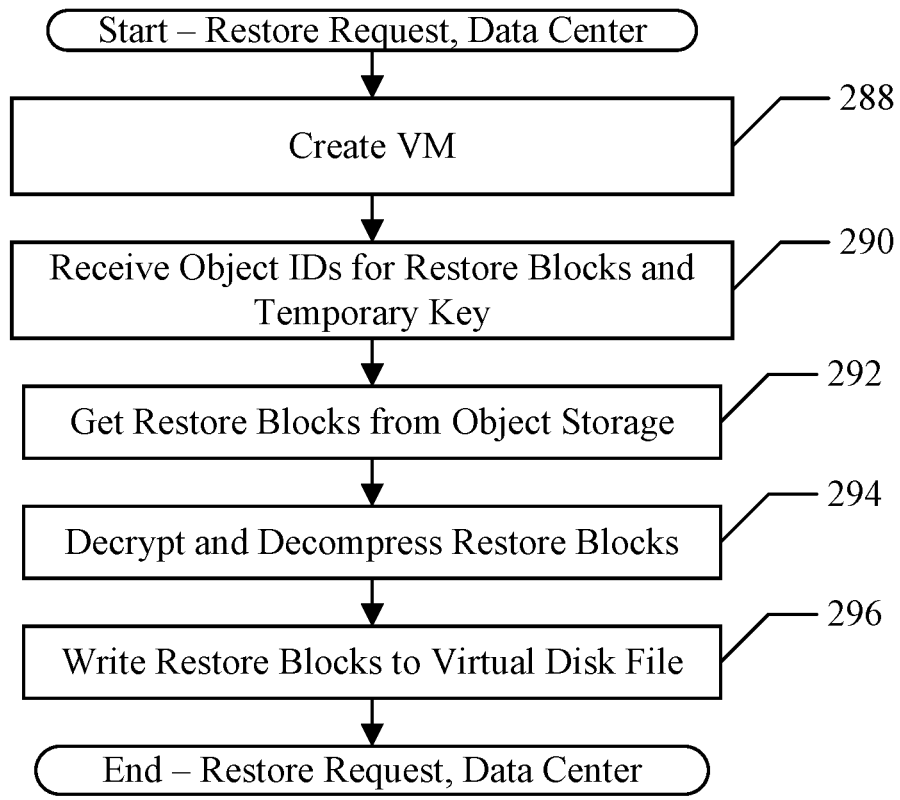
FIG. 15 is a flowchart illustrating operation of one embodiment of a backup agent for performing the restore operation.
Figure 16:
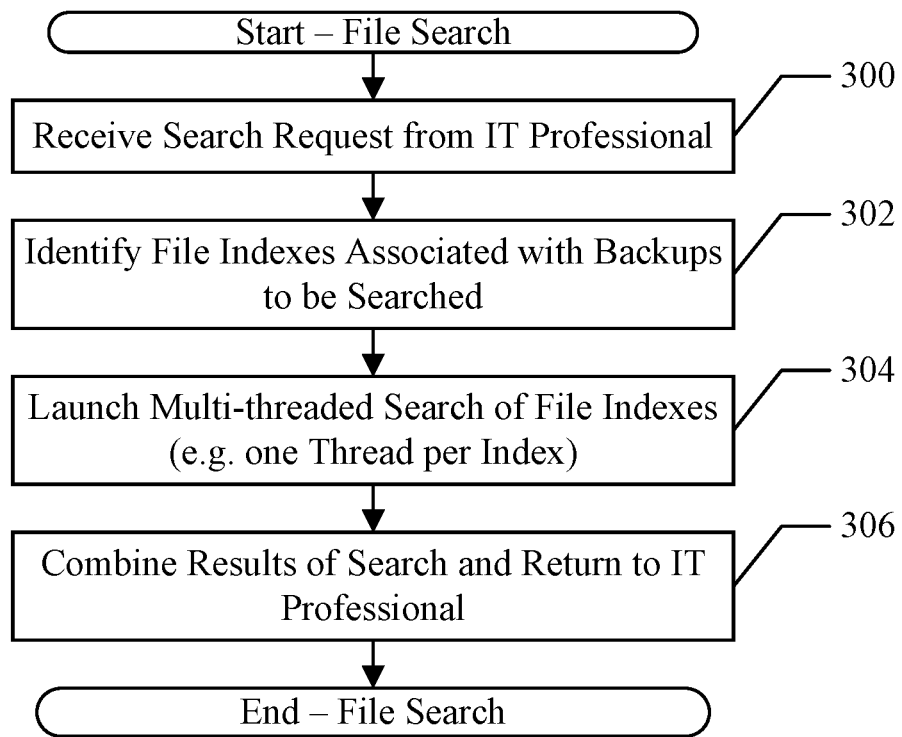
FIG. 16 is a flowchart illustrating operation of one embodiment of a file search in the file indexes.

Restore Operation (FIGS. 14-16)

In one embodiment, the data protection service may support restore of complete backups or a file-level restore in which one or more files are identified to be restored from a backup data set by the IT professional responsible for a given site. A complete restore may include transferring all of the data in a data set to the target of the restore. For example, for a virtual machine embodiment, the data set may be the virtual machine (e.g. the virtual disk(s) forming the virtual machine). For a database, the data set may be the complete database data structure. For a file system, the data set may be a volume, a set of volumes, or the entire file system. As with the preceding discussion, the description below will refer to the restore of a virtual machine backup, but similar operation may be supported for a database or file system backup as well.

FIG. 14 is a flowchart illustrating operation of one embodiment of the data protection service 10 to perform a restore operation for a virtual machine backup. The operation of FIG. 14 may be performed in response to a restore request generated by the IT professional. For example, the IT professional may interact with the data protection service 10 via the UI server 93/UI backend 92 to request a restore operation. The UI server 93 may present the IT professional with a list of available backup data sets for a given virtual machine. The UI backend 92 may, for example, communicate the virtual machine name (and OrgID for the organization) to the catalog service 78 to identify available backups and may provide a listing of the available backups to the UI server 93 to provide for the IT provisional. The IT professional may select the desired backup, and the catalog service 78 may provide the backup ID for that backup to the backup service 80 with a restore request. Alternatively, the catalog service 78 may provide one or more object IDs for the backup data set in the object storage 90. For example, the object ID for the data descriptor for the backup data set (e.g. the L1 for the backup, in an embodiment) may be provided. The IT professional may then initiate the restore. In the case of a file-level restore, the IT professional may search for a file name across the file indexes for a given virtual machine, and may select the version desired for the restore. Alternatively, the IT professional may search based on file contents (e.g. using the checksum of the desired contents and the checksums in the file indexes) to identify the desired version. The UI backup 92 may communicate with the catalog service 78/backup service 80 to identify the file indexes, and may cause the search to occur based on the file name/checksum data provided by the IT professional. The IT professional may select a file version, and the backup data set containing that file may be identified and restored to the VM instance (or sent to the IT professional for placement in the desired location). The data protection service 10 (and more particularly the backup service 80) may include instructions which, when executed on a computer in the public cloud 12, cause the computer to perform operations as illustrated in FIG. 14. For a portion of FIG. 14, e.g. blocks 210 and 270-280, the instructions may be loaded by the backup service 80 into a VM instance to be executed in the VM instance to perform the illustrated operations, in an embodiment.

Similar to the restore and verify processing discussed above with regard to FIG. 10, the backup service 80 may establish a VM instance for the restore operation by bidding for a spot instance and/or using on on-demand instance (reference numerals 200, 202, 204, and 206), may establish a block storage for the VM instance (reference numeral 208). The backup service 80 may check for a snapshot corresponding to the backup in the snapshots that are being maintained by the data protection service 10 for previous backups. If there is a snapshot available (decision block 271, "yes" leg), the backup service 80 may copy the snapshot to the block storage to restore the backup (reference numeral 273). In an embodiment, the backup service 80 may check for earlier snapshots for the same virtual machine as well. If there is an earlier snapshot, the backup service 80 may copy the earlier snapshot to the block storage and then restore the difference between the earlier snapshot and the selected backup. If there is not a snapshot available (decision block 271, "no" leg), the backup service may restore the backup to the VM instance (reference numeral 210). In this case, the backup data set may be identified by the object ID for the L1 data descriptor that describes the virtual disk for the virtual machine (or multiple L1 data descriptors for multiple virtual disks). The restore may be performed by searching for the fingerprints in the L1 in L0 metadata for the backup and/or in the fingerprint database 100, locating the backup data blocks, decrypting and decompressing, etc. as shown in FIG. 11.

If the restore operation is a full restore (decision block 270, "yes" leg), the backup service 80 may use restore data blocks to transmit the restore data to the site. The restore data blocks may each contain a plurality of the backup data blocks used to form the backup. For example, as previously described, the backup data blocks may be 16 kB in size. A restore data block may be 64 megabytes (MB) in size, although larger or smaller sizes may be defined for the restore data block in other embodiments. The backup data blocks may be smaller to permit reasonably-sized fingerprints to be defined and to allow for more frequent deduplication, for example. On the other hand, restore data blocks may be defined to allow for greater compression to be achieved, reducing the amount of object storage and bandwidth consumed to transmit the blocks to the restore site.

The restore may rely on the resources in the public cloud 12 to perform the bulk of the processing for the restore operation. For example, when a snapshot is not available, the full restore may be assembled by reading the L0MD (if any) and/or the fingerprint database 100 for each fingerprint in the backup, reading the corresponding L0 data structure identified for each fingerprint, decrypting and decompressing the backup data block, assembling the restore data blocks, compressing and encrypting the restore data blocks and putting them restore data blocks in the object storage 90. The backup agent 84 on the site may get the restore data blocks, decrypt and decompress the restore data blocks, and assemble the restore data blocks onto the restored virtual machine.

For a full restore, the restore data blocks may be a plurality of consecutive backup data blocks from the backup data set. That is, the initial restore data block for a restore operation may be the plurality of backup data blocks from the initial logical offsets in the virtual disk, concatenated together. For 16 kB backup data blocks and 64 MB restore data blocks, for example, the 16 kB backup data blocks from the initial 4000 offsets may be concatenated to form the initial restore data block (assuming base 10 kB and MB, i.e. 1 kB=1000 bytes and 1 MB=1,000,000 bytes). The next consecutive 4000 backup data blocks may form the next restore data block, etc.

The VM instance may read the restore data blocks from the block storage (reference numeral 272) and may compress and encrypt the restore data blocks (reference numeral 274). In other embodiments, compression and/or encryption may not be performed or may be optional. The encryption may use a temporary key (e.g. a key different from the key(s) used to encrypt the backup data blocks). The temporary key may be obtained from the key management service 88, but may not be retained after the restore operation. The VM instance may put the restore blocks in the object storage 90 (reference numeral 276), and may provide the object IDs for the restore blocks to the backup agent 84 to get the restore blocks (reference numeral 278). The backup service 80 may provide the temporary key with the restore block object IDs for decryption. Once the restore blocks have been placed in the object storage and the object IDs provided, the restore operation may be complete and the backup service 80 may delete the VM instance and the block storage allocated to that VM instance (reference numeral 282).

For a file level restore (decision block 270, "no" leg), the IT professional may have searched for the file in the file indexes and identified the backup data set that has been restored to the VM instance as the backup of the file. The VM instance may be provided with the full pathname to the file, and may retrieve the file. The requested file may be returned to the IT professional, who may determine where to place the restored file (reference numeral 280). For example, the IT professional may choose to restore to file it to its original location in the source virtual machine, or may place the file in another location in the virtual machine or otherwise make the file accessible to the user of the virtual machine to access and restore to the desired location. The file may be passed through the object storage 90, or may be provided in a message, as desired.

As mentioned previously, other data sets may be supported by the data protection service 10 and a similar restore process may be performed. For example, for a file system or portion thereof, a block storage may be established, a snapshot of the backup may be copied or the backup may be restored from L1, L0, and L0MD data for the backup, restore blocks may be read, compressed, encrypted, and put to the object storage 90, object IDs for the restore blocks and the temporary key may be provided to the backup agent, and the block storage may be deleted, similar to reference numerals 208, 271, 273, 210, 270, 272, 274, 276, 278, and 282. File level restores may be performed as well similar to reference numeral 280. For a database or portion thereof, a block storage may be established, a snapshot of the backup may be copied or the backup may be restored from L1, L0, and L0MD data for the backup, restore blocks may be read, compressed, encrypted, and put to the object storage 90, object IDs for the restore blocks and the temporary key may be provided to the backup agent, and the block storage may be deleted, similar to reference numerals 208, 271, 273, 210, 270, 272, 274, 276, 278, and 282.

In addition to the operation shown in FIG. 14, the backup service 80 may also transmit a series of commands to the backup agent 84 to perform the full restore at the data center as well, similar to the discussion above for capturing a backup. FIG. 15 is a flowchart illustrating operation of the backup agent 84, responsive to the commands, to restore the data at the data center. The backup agent 84 may include instructions which, when executed on a computer in the data center, cause the computer to perform operations as illustrated in FIG. 15.

The backup agent 84 may create a new virtual machine to receive the restore (reference numeral 288). Creating a new virtual machine, rather than restoring the backup to the original virtual machine, may allow the IT professional or virtual machine user to review the restored backup to ensure that the desired backup has been restored, an may allow the IT professional to control the ultimate disposition of the original virtual machine (e.g. deleting the original virtual machine if the restore virtual machine is correct and acceptable). If the backup were restored to the original virtual machine, the current state of the original virtual machine may be lost if there is no recent backup of the current state. That loss may be undesirable if, e.g., the selected backup that was restored did not include some desired data. For example, the selected backup may actually have been older than desired, which may be discovered when the content of the restored backup is reviewed. Similarly, a new file system volume may be created to restore the file system, and a new database managed by the one of the DB servers 50A-50B may be created to restore a database.

The backup agent 84 may receive the object IDs for the restore data blocks and the temporary key from the backup service 80 (reference numeral 290). The object IDs for the restore data blocks may be provided in consecutive order of the restore data blocks in the virtual disk, so the backup agent 84 may process the blocks in order to obtain the restore copy of the virtual disk. The backup agent 84 may get the restore blocks from the object storage 90 (reference numeral 292), decrypt and decompress the blocks (reference numeral 294), and write the restore blocks to the virtual disk file for the new VM (reference numeral 296). Once the blocks have been processed, the virtual disk file may be complete. If there is more than one virtual disk, additional restore pointers may be provided and the backup agent 84 may restore the additional virtual disks in a similar fashion.

As discussed above for performing backups, the restore operations performed by the backup agent 84 may be pipelined among independent processes. That is, a process may get restore blocks, another process may decrypt the restore blocks, yet another process may decompress the restore blocks, and yet another process may write the restore blocks to the virtual disk file (and delete the copies of the restore blocks). The pipelining may permit efficient processing and prevent consumption of significant amounts of memory with restore blocks waiting to be processed, for example.

To perform a file-level restore (as opposed to a complete restore of a virtual machine or file system data set), the IT professional may first identify the file and version of the file to be restored, in an embodiment. FIG. 16 is a flowchart illustrating operation of one embodiment of the data protection service 10 supporting a search for a file, for one embodiment. The data protection service 10 may include instructions which, when executed on a computer in the public cloud 12, cause the computer to perform operations as illustrated in FIG. 16.

The IT professional may provide a search request for a file (e.g. interacting through the UI server 93/UI backend 92) (reference numeral 300). The search request may identify the virtual machine/file system and may provide one or more characters in the file name, for example. A search by file content may be supported as well, in which the search request may identify the virtual machine and provide a checksum to be matched in the file indexes. The data protection service 10 may identify file indexes corresponding to backups of the specified virtual machine. In an embodiment, the object IDs for the file indexes may be associated with OrgID and virtual machine name. Object IDs for the file indexes in the object storage 90 may be provided (reference numeral 302). The data protection service 10 may get the file indexes, and may launch a multi-threaded search of the file indexes (reference numeral 304). For example, one thread per file index may be used. The thread may perform a binary search on each file index to locate a desired file name or checksum (or multiple file names that match a partial file name request, in an embodiment). The public cloud 12 may support a search thread service that may be used for this purpose. For example, in the Amazon AWS public cloud, Athena is a serverless interactive query service that may conduct searches using standard structured query language (SQL) searches.

The data protection service may combine the results of the searches from each file index, and may return the combined results to the IT professional to select which version of the file is desired (reference numeral 306). When multiple backup data sets have the same version of the file (e.g. the same full path and modify time), the results may be consolidated so that the modify time is presented once. The number of copies may also be indicated, in an embodiment.

As mentioned previously, while the above description refers to virtual machines and restore of a virtual disk, other embodiments may perform restores of other types of data sets (e.g. a database, a file system, a subset of a file system such as a volume, etc.). That is, the data protection service 10 in the public cloud 12 may restore the data set, assemble restore data blocks that are a multiple of the size of the backup data blocks from the restored data set, compress and encrypt the restore data blocks, put the restore data blocks in the object storage 90, and provide the object IDs to the restore data blocks to the site. The site may get the restore data blocks, decompress and decrypt the restore data blocks, and assemble the restored data set from the restore data blocks.

Figure 17:
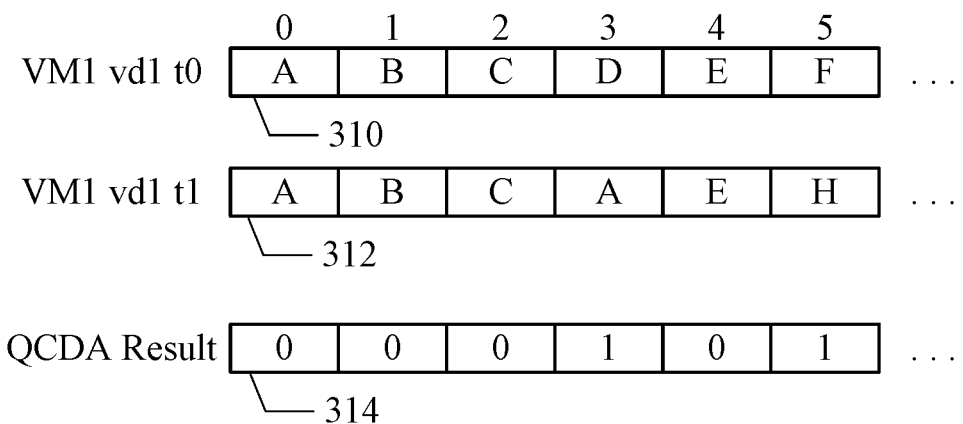
FIG. 17 is a block diagram illustrating an example of the result of a QCDA between t0 and t1 for the illustrated blocks.
Figure 18:
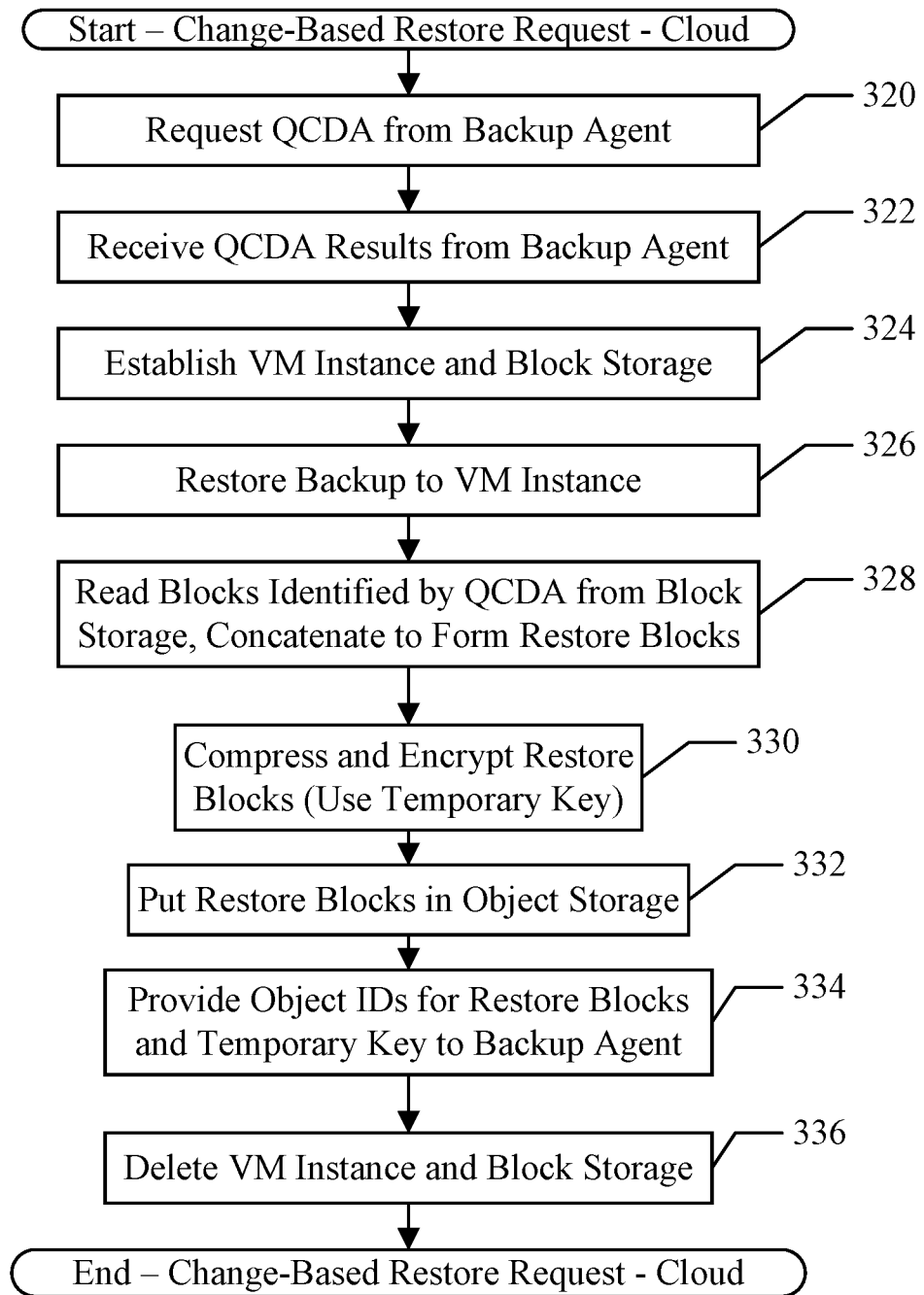
FIG. 18 is a flowchart illustrating operation of one embodiment of the backup service for a change-based restore.
Figure 19:
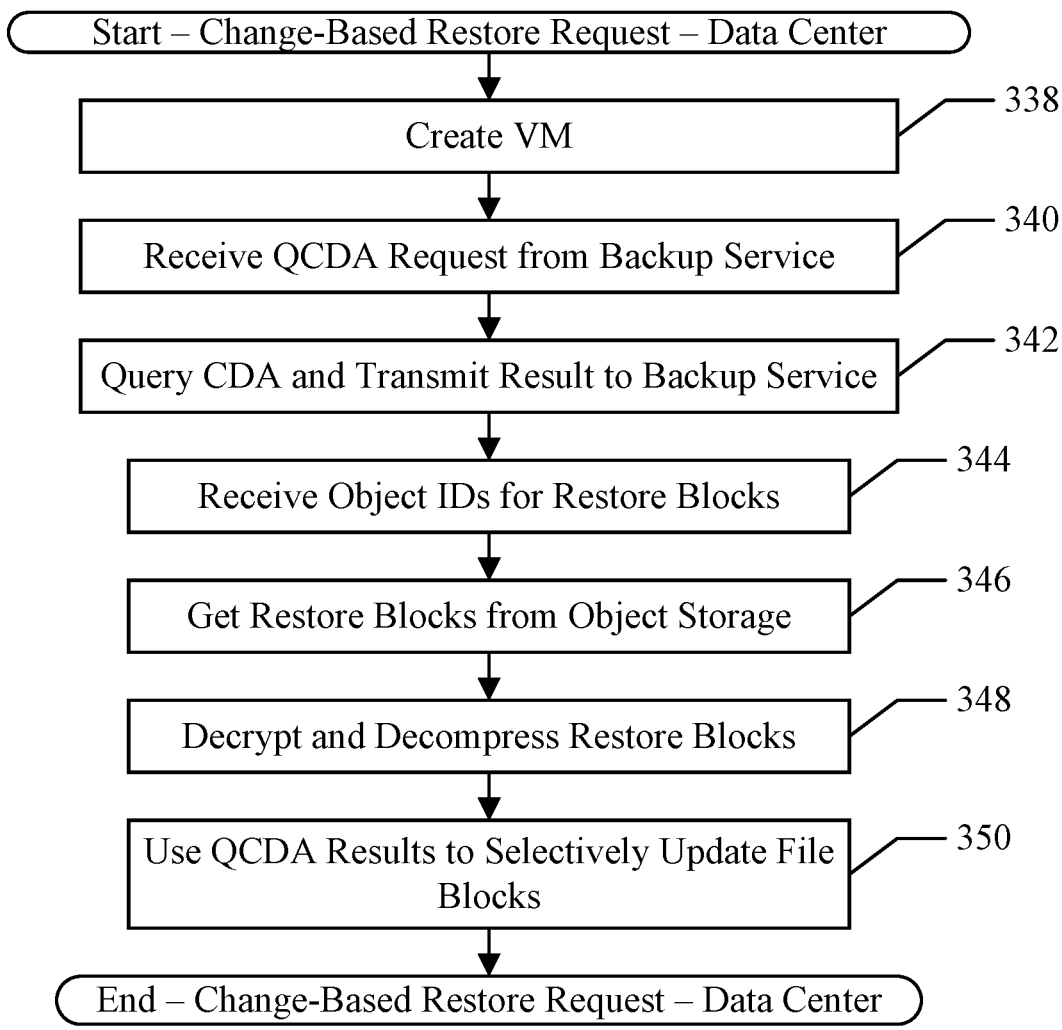
FIG. 19 is a flowchart illustrating operation of one embodiment of the backup agent for a change-based restore.

Change-Based Restore (FIGS. 17-19)

The above discussion for performing a restore from a backup refers to restoring the entire data set or performing restore of individual files. However, for many types of workloads, the amount of change from backup to backup may be fairly small (e.g. on the order of 3-5% of the data may change per day). Accordingly, to restore the state of a data set to a given backup that was captured relatively recently, it may only be necessary to restore a small portion of the overall data set (e.g. the portion that has been modified after the given backup was captured). Viewed in another way, if a restore is being performed because of corruption to the data set or data loss within the data set, and the event that caused the corruption/loss occurred after a given backup was captured, then the corruption/loss is known to be limited to the data that has been changed in the data set since the given backup was captured. Restoring the data that has been changed may recover from the corruption/data loss event, and may be less time consuming, may consume fewer resources, and may be less costly than a full restore.

In an embodiment, the change block tracking service/mechanism used to determine the changed data to perform an incremental backup may also be used to identify the data that has been modified since the given backup was made. Instead of using the changed data information to capture data to back up, the changed data information may be used to determine which backup data blocks to restore. The amount of data transferred to have the effect of a full restore to the backup may be significantly reduced compared to the full restore, which may improve performance and reduce cost in some embodiments.

Determining which backup data blocks have changed since a given backup has been performed and restoring only the blocks that have changed to have the effect of a full restore may be referred to herein as a "change-based restore." Change-based restore techniques may be used for any type of data center and corresponding backup data set (e.g. virtual machines, file systems, databases, etc.). Virtual machines will be used as an example in more detail below, but similar discussion applies to any data set.

FIG. 17 is a block diagram illustrating the state of virtual disk 1 (vd1) for VM1 at a time t0 that a backup was taken and at a time t1. The time t1 may be the present time, for example, if a change-based restore is being performed. The time t1 may also be any other desired time. The backup data blocks of vd1 corresponding to block offsets 0 through 5 are shown, where a different letter signifies different content and the same letter signifies the same content. Thus, at time t0 (reference numeral 310), the blocks at offsets 0 through 5 have contents A, B, C, D, E, and F. At time t1 (reference numeral 312), the blocks at offsets 0 through 2 and 4 remain unmodified (A, B, C, and E, respectively). However, the contents of the blocks at offsets 3 and 5 have changed (from D to A, and from F to H, respectively). Accordingly, a QCDA may produce a result (reference numeral 314) including zero (unchanged) for blocks at offsets 0 through 2 and 4, and one (changed) for blocks at offsets 3 and 5. To restore vd1 to the state at time t0 for the blocks shown, the blocks at offsets 3 and 5 need to be restored to D and F, respectively. By returning the blocks indicated as changed in the QCDA result 314 from the backup at time t0, and writing the blocks to the current state vd1 at the corresponding offsets, the effect of a full restore to the time t0 may be achieved.

FIG. 18 is a flowchart illustrating operation of one embodiment of the data protection service 10 on the public cloud 12 to implement a change-based restore. The operation of FIG. 18 may be initiated in response to a restore request from organization (e.g. initiated by an IT professional from the organization). For example, the IT professional may interact with the data protection service 10 via the UI server 93/UI backend 92 to request a restore operation. The UI server 93 may present the IT professional with a list of available backup data sets for a given virtual machine. The UI backend 92 may, for example, communicate the virtual machine name (and OrgID for the organization) to the catalog service 78 to identify available backups and may transmit a list of available backups to the UI server 93 to display for the IT provisional. The IT professional may select the desired backup, and the catalog service 78 may provide one or more object IDs to the backup data set in the object storage 90 (or may provide the backup ID to the backup service 80, which may provide the object IDs). For example, the object ID to the data descriptor for the backup data set (e.g. the L1 for the backup, in an embodiment) may be provided. The IT professional may then initiate the restore through the UI server 93, which may cause the UI backend 92 to provide the restore request and the L1 pointer to the backup service 80. The data protection service 10 (and more particularly the backup service 80) may include instructions which, when executed on a computer in the public cloud 12, cause the computer to perform operations as illustrated in FIG. 18. For a portion of FIG. 18, e.g. blocks 326-334, the instructions may be loaded by the backup service 80 into a VM instance to be executed in the VM instance to perform the illustrated operations, in an embodiment.

The backup service 80 may transmit a QCDA request to the backup agent 84 (reference numeral 320). The QCDA request may include the name of the virtual machine and the time stamp corresponding to the backup that is to be restored (e.g. t0 in the example of FIG. 17). The backup service 80 may receive the QCDA results from the backup agent 84 (reference numeral 322). The backup service 80 may establish a VM instance and establish a block storage for the VM instance (reference numeral 324) and may load instructions into the VM instance to perform the remainder of the operation illustrated in FIG. 18, in an embodiment. Establishing the VM instance may including bidding for a spot instance and either successfully winning the bid or establishing an on-demand instance, and establishing a block storage for the VM instance, similar to blocks 200, 202, 204, 206, and 208 as shown in FIGS. 10 and 14.

The VM instance may restore the backup to the block storage associated with the VM instance (reference numeral 326). Restoring the backup may include determining if there is a snapshot available and copying the snapshot, and restoring the VM instance as described for reference numeral 210, e.g. as shown in FIG. 11, if a snapshot is not available. Alternatively, in this embodiment, the restore may skip the backup data blocks that are not indicated as changed in the QCDA results, and may restore only the backup data blocks that have been changed (at their respective offsets in the block storage). The VM instance may read the backup data blocks from the block storage that are identified as changed in the QCDA results, and may concatenate the blocks to form one or more restore data blocks (reference numeral 328). Since the backup data blocks are a known size and the QCDA results identify the offsets to which the blocks are to be restored, concatenating the blocks into restore blocks for compression and encryption may allow for efficient transfer of the data, and once decrypted and decompressed, the backup data blocks may be separated again and written to the restore target at the respective offsets based on the QCDA results.

The VM instance may compress and encrypt the one or more restore blocks (using a temporary key obtained from the key management service 88, similar to the discussion for a full restore above with regard to FIG. 14) (reference numeral 330), and may put the restore blocks in the object storage 90 (reference numeral 332). The VM instance may provide the object ID(s) for the restore block(s) and the temporary key to the backup agent 84 (reference numeral 334). The backup service may then delete the VM instance and block storage (reference numeral 336).

For a file system embodiment, a similar set of operations may be performed, but not necessarily in the context of a virtual machine. That is, the changed blocks of the file system (or portion thereof to be restored) may be determined based on the change block tracking service, a block storage may be established and the backup from the preceding time stamp may be restored, the backup blocks identified as changed may be read and restore blocks may be performed, compression and encryption may be performed, the restore blocks may be placed in the object storage, object IDs may be provided to the backup agent, and the block storage may be deleted as in reference numerals 320, 322, 324, 326, 328, 330, 332, 334, and 336. Similarly, for a database embodiment that supports change block tracking in the database, a restore may be performed as in reference numerals 320, 322, 324, 326, 328, 330, 332, 334, and 336.

FIG. 19 is a flowchart illustrating operation of one embodiment of the backup agent 84 at that data center site to which the change-based restore is to be performed. As mentioned previously, the backup service 80 may transmit commands to the backup agent 84 to perform the operations illustrated in FIG. 19. The backup agent 84 may include instructions which, when executed on a computer in a data center, cause the computer to perform operations as illustrated in FIG. 19.

Similar to the full restore, a new virtual machine may be created to receive the change-based restore. In this case, the new virtual machine may receive a copy of the virtual disks from the virtual machine being restored (reference numeral 338). The backup agent 84 may receive the QCDA request from the backup service 80 (reference numeral 340), and may perform the query and transmit the results to the backup service 80 (reference numeral 342). The backup service 80 may subsequently transmit the object IDs for the restore blocks in the object storage 90 and the temporary key, along with commands to process the restore blocks and update the restore target. The backup agent 84 may receive the object IDs for the restore blocks (reference numeral 344), and may get the restore blocks from the object storage 90 (reference numeral 346). The backup agent 84 may decrypt and decompress the restore blocks (reference numeral 348). The QCDA results may be used to selectively update the virtual disk file blocks. That is, the backup agent 84 may select the first backup data block from the decrypted, decompressed restore blocks and write the first backup data block to the first offset indicated in the QCDA results as changed; select the second backup data block from the decrypted, decompressed restore blocks and write the second backup data block to the second offset indicated in the QCDA results as changed; etc. until the backup data blocks have been restored. For the example of FIG. 17, the first data block would be data block D and would be restored to offset 3, followed by the second data block (data block F) restored to offset 5.

For file system or database embodiments, similar operation to reference numerals 338, 340, 342, 344, 346, 348, and 350 may be performed but not necessarily in the context of a virtual machine. For example, a new file system or portion thereof, or new database or portion thereof, may be created and the current file system/portion or database/portion may be copied to the newly created data set. The restore blocks may be restored in a similar fashion.

As mentioned previously, the operations illustrated in FIG. 19 may be pipelined among multiple independent processes form the backup agent 84, for efficiency and to prevent significant memory consumption by the restore blocks.

Figure 20:
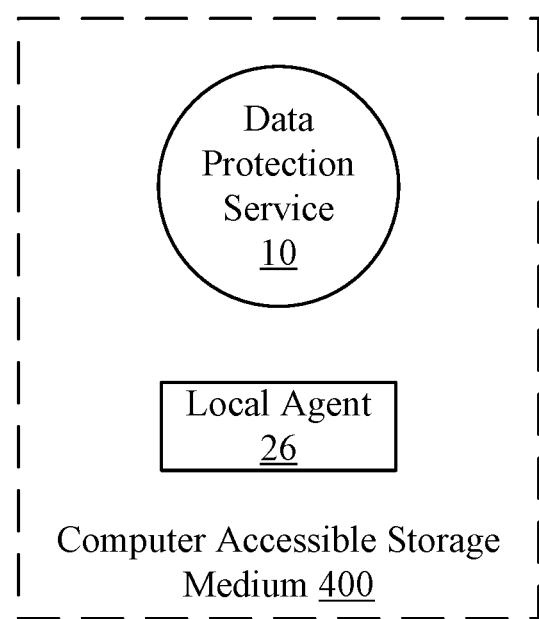
FIG. 20 is a block diagram of one embodiment of a computer accessible storage medium.
Figure 21:
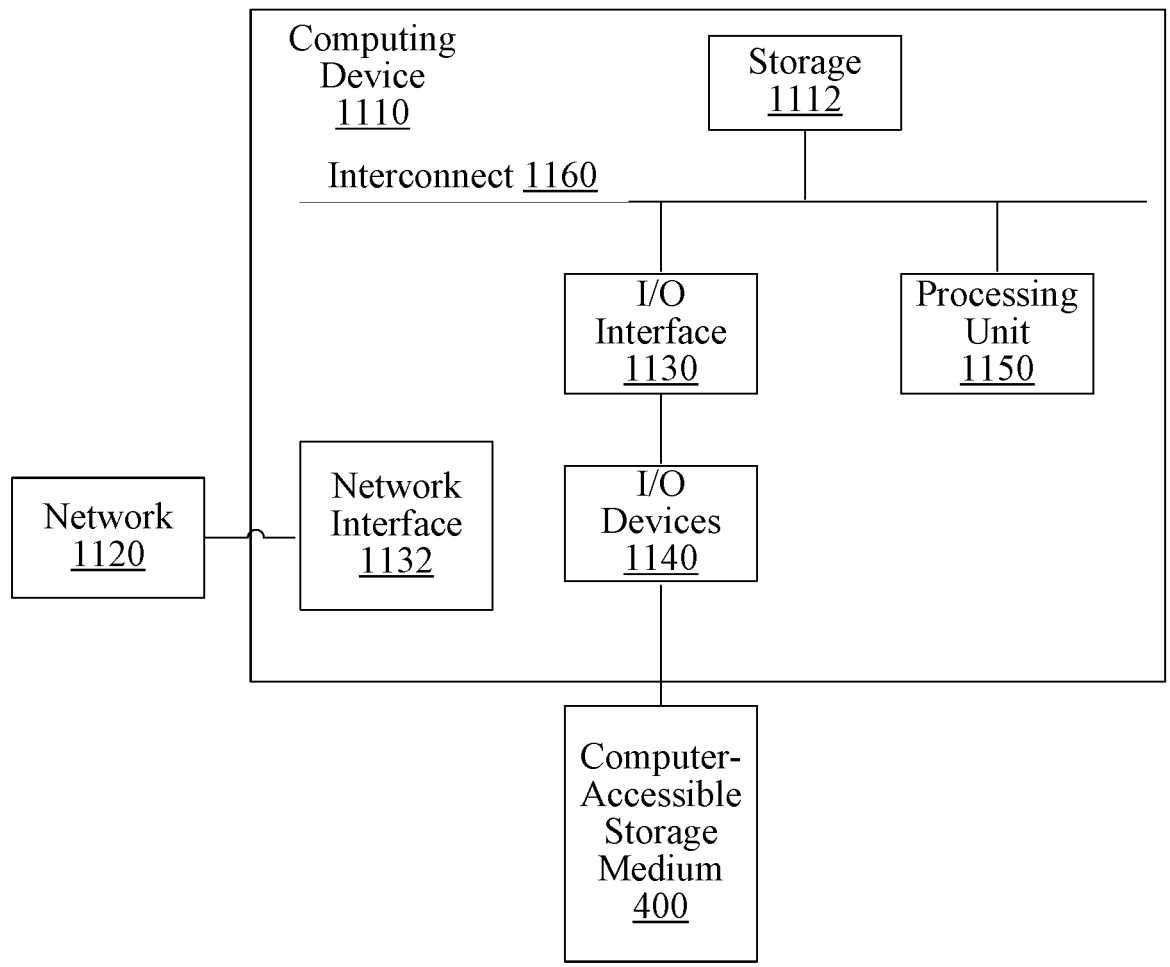
FIG. 21 is a block diagram of one embodiment of a computer system.

Medium and System (FIGS. 20-21)

Turning now to FIG. 20, a block diagram of one embodiment of a computer accessible storage medium 400 is shown. Generally speaking, a computer accessible storage medium 400 may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 400 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 400 in FIG. 20 may store one or more of the data protection service 10 and the local agent 26. The data protection service 10 and the local agent 26 may each include instructions which, when executed on a computer, cause the computer to perform the operations described for the data protection service 10 and/or the local agent 26. Any portion of the local agent 26 and/or the data protection service 10 may be stored, in various embodiments. For example, any subset of the services illustrated in FIG. 5 for the data protection service 10 may be stored. Any subset of the local agent 26 as illustrating in FIG. 5 may be stored as well.

FIG. 21 is a block diagram of one embodiment of a computing device (which may also be referred to as a computing system or simply a computer) 1110, according to some embodiments. The computing device 1110 may be used to implement various portions of this disclosure. The computing device 1110 is one example of a device that may be used as a server computing system in a data center 22 that hosts a virtual machine, database, or file server, a server computing system in the public cloud 12, or any other computing system implementing portions of this disclosure.

The computing device 1110 may be any suitable type of device, including, but not limited to, a personal computer system, desktop computer, laptop or notebook computer, mobile phone, mainframe computer system, web server, workstation, or network computer. As shown, the computing device 1110 includes a processing unit 1150, a storage subsystem 1112, and an input/output (I/O) interface 1130 coupled via an interconnect 1160 (e.g., a system bus). The I/O interface 1130 may be coupled to one or more I/O devices 1140. The computing device 1110 further includes a network interface 1132, which may be coupled to a network 1120 for communications with, for example, other computing devices. For example, the network 1120 may be part of or all of a network in a data center, the network between the data center and the public cloud, 12, the network in the public cloud 12, etc.

The processing unit 1150 may include one or more processors. In some embodiments, the processing unit 1150 includes one or more coprocessor units. In some embodiments, multiple instances of the processing unit 1150 may be coupled to the interconnect 1160. The processing unit 1150 (or each processor within processing unit 1150) may contain a cache or other form of on-board memory. In some embodiments, the processing unit 1150 may be implemented as a general-purpose processing unit, and in other embodiments it may be implemented as a special purpose processing unit (e.g., an ASIC). In general, the computing device 1110 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

The storage subsystem 1112 is usable by processing unit 1150 (e.g., to store instructions executable by and data used by processing unit 650). Storage subsystem 1112 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. The storage subsystem 1112 may consist solely of volatile memory in some embodiments. The storage subsystem 1112 may store program instructions executable by the computing device 1110 using the processing unit 1150, including program instructions executable to cause the computing device 110 to implement the various techniques disclosed herein. Thus, the storage subsystem 1112 may include the computer accessible storage medium 400 storing instructions forming the data processing service 10 and/or the local agent 26, for example.

The I/O interface 1130 may represent one or more interfaces and may be any of various types of interfaces configured to couple to and communicate with other devices, according to various embodiments. In some embodiments, the I/O interface 1130 is a bridge chip from a front-side to one or more back-side buses. I/O interface 1130 may be coupled to one or more I/O devices 110 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). Particularly, the computer readable medium 400 may be an I/O device 1140 or maybe coupled to the I/O devices 1140 to supply instructions and/or data to the computing device 1110.

Realizations of the subject matter of this application include, but are not limited to, the following examples:

Examples: Public Cloud Data Protection Service

1. A method comprising:
    determining, in a public cloud-based data protection service, that a backup of a first data set at a first data center is to be performed;
    issuing one or more commands from the data protection service to a backup agent at the first data center responsive to determining that the backup is to be performed;
    responsive to the one or more commands, the backup agent:
        determining one or more first data blocks in the first data set that have changed since a previous backup of the first data set;
        generating one or more first fingerprints indicative of a content of respective ones of the one or more first data blocks;
        assembling the one or more first fingerprints and the one or more first data blocks as a first backup data;
        putting the first backup data in an object storage in the public cloud; and
        providing one or more identifiers for the first backup data in the object storage to the data protection service.
2. The method of example 1 wherein the first backup data comprises a list of the one or more first fingerprints concatenated with the one or more first data blocks, and wherein the list includes an offset into the first backup data for a given fingerprint of the one or more first fingerprints to a corresponding data block of the one or more first data blocks.
3. The method of examples 1 or 2 further comprising compressing, by the backup agent, the one or more first data blocks prior to assembling the first backup data.
4. The method of any of examples 1-3 further comprising encrypting, by the backup agent, the one or more first data blocks.
5. The method of example 4 wherein the one or more commands include a first command providing a first key to perform the encrypting.
6. The method of example 5 further comprising obtaining, by the data protection service, the first key from a key management service provided by the public cloud.
7. The method of example 6 wherein obtaining the first key further comprises obtaining a first cipher text corresponding to the first key, wherein the first cipher text identifies the first key to the key management service.

8. The method of example 7 wherein assembling the first backup data comprises providing the first cipher text in the first backup data.

9. The method of example 8 wherein the first cipher text is included in a header of the first backup data.

10. The method of any of examples 1-9 further comprising:
    assembling, by the backup agent, a first data descriptor having a location for each data block within the first data set; and
    partially populating the first data descriptor, by the first backup agent, with the one or more first fingerprints at locations corresponding to the one or more first data blocks.

11. The method of example 10 further comprising, responsive to the plurality of commands, the backup agent putting the first data descriptor in the object storage.

12. The method of example 11 further comprising:
    getting, by the data protection service, the first data descriptor from the object storage;
    getting, by the data protection service, a second data descriptor from the object storage, the second data descriptor corresponding to the previous backup of the first data set; and
    merging, by the data protection service, fingerprints from the second data descriptor to the first data descriptor in locations in the first data descriptor for which corresponding blocks did not change since the previous backup.

13. The method of example 12 further comprising putting the merged first data descriptor in the object storage, replacing the first data descriptor in the object storage.

14. The method of any of examples 1-13 further comprising:
    the backup agent transmitting the one or more first fingerprints to the data protection service to query a database of fingerprints, wherein the database of fingerprints corresponds to data blocks that have previously been backed up;
    the data protection service returning a result indicating which ones of the one or more first fingerprints match in the database of fingerprints; and
    responsive to the result, the backup agent eliminating the matched first fingerprints and corresponding first data blocks from the first backup data.

15. The method of example 14 wherein the data protection service is multi-tenant, and wherein the database of fingerprints includes an organization identifier identifying an organization that is one of the tenants, and wherein the backup agent transmits a first organization identifier identifying a first organization that owns the first data center with the one or more first fingerprints.

16. The method of example 15 further comprising matching, by the data protection service, the first organization identifier and a given fingerprint of the one or more first fingerprints to an entry in the database to detect a match in the database.

17. The method of example 15 further comprising matching, by the data protection service, a given fingerprint of the one or more first fingerprints to a second fingerprint in the database to detect a match in the database even in an event that the first organization identifier does not match the organization identifier associated with the second fingerprint in the database.

18. The method of any of examples 1-17 further comprising:
    storing the first backup data in a plurality of data structures; and
    providing a second data structure that includes a list of identifiers for the plurality of data structures.

19. A non-transitory computer accessible storage medium storing a plurality of instructions which, when executed on one or more computers, cause the one or more computers to perform operations of the method of any of examples 1-18.

20. One or more computer systems, each of the one or more computer systems comprising one or more processors coupled to the computer accessible storage medium of example 19.

21. A method comprising:
    initiating, from a public cloud-based data protection service, a backup of a first data set at a first data center;
    responsive to the initiating, a backup agent at the first data center:
        generating one or more first fingerprints indicative of a content of one or more first data blocks in the first data set;
        assembling the one or more first fingerprints and the one or more first backup data blocks as one or more objects;
        putting the one or more objects in an object storage in the public cloud; and
        providing one or more identifiers for the one or more objects in the object storage to the public cloud-based data protection service.

22. The method of example 21 wherein the one or more objects comprises a data descriptor including the one or more first fingerprints.

23. The method of example 22 further comprising:
    determining, by the backup agent, that the one or more first backup data blocks have changed in the first data set since a previous backup of the first data set; and
    partially populating the data descriptor with the one or more first fingerprints corresponding to the one or more first backup data blocks, wherein the data descriptor excludes fingerprints for backup data blocks in the first data set that have not changed.

24. The method of any of examples 21-23 wherein the one or more objects further comprise one or more backup data objects, wherein each of the one or more backup data objects comprises a list of first fingerprints and the corresponding first backup data blocks, and an offset from each of the first fingerprints to the corresponding first backup data block in the backup data object.

25. The method of example 24 further comprising compressing, by the backup agent, the one or more first backup data blocks prior to assembling the one or more backup data objects.

26. The method of example 24 or 25 further comprising encrypting, by the backup agent, the one or more first backup data blocks.

27. The method of example 26 further comprising providing, from the data protection service, a first key to perform the encrypting.

28. The method of example 27 further comprising obtaining, by the data protection service, the first key from a key management service provided by the public cloud.

29. The method of example 28 wherein obtaining the first key further comprises obtaining a first cipher text corresponding to the first key, wherein the first cipher text identifies the first key to the key management service.

30. The method of example 29 wherein assembling the first backup data comprises providing the first cipher text in the first backup data.

31. The method of example 30 wherein the first cipher text is included in a header of one or more backup data objects.

32. The method of any of examples 21-31 further comprising:
the backup agent transmitting the one or more first fingerprints to the data protection service to query a database of fingerprints, wherein the database of fingerprints corresponds to data blocks that have previously been backed up;
the data protection service returning a result indicating which ones of the one or more first fingerprints match in the database of fingerprints; and
responsive to the result, the backup agent eliminating the matched first fingerprints and corresponding first data blocks from the one or more backup data objects.

33. The method of example 32 wherein the data protection service is multi-tenant, and wherein the database of fingerprints includes an organization identifier identifying an organization that is one of the tenants, and wherein the backup agent transmits a first organization identifier identifying a first organization that owns the first data center with the one or more first fingerprints.

34. The method of example 33 further comprising matching, by the data protection service, the first organization identifier and a given fingerprint of the one or more first fingerprints to an entry in the database to detect a match in the database.

35. The method of example 33 further comprising matching, by the data protection service, a given fingerprint of the one or more first fingerprints to a second fingerprint in the database to detect a match in the database even in an event that the first organization identifier does not match the organization identifier associated with the second fingerprint in the database.

36. A non-transitory computer accessible storage medium storing a plurality of instructions which, when executed on one or more computers, cause the one or more computers to perform operations of the method of any of examples 21-35.

37. One or more computer systems, each of the one or more computer systems comprising one or more processors coupled to the computer accessible storage medium of example 36.

Examples: Deduplication

38. A method comprising:
transmitting a first fingerprint identifying a first block of backup data to a cloud-based data protection service from a first site of a first organization;
detecting a match for the first fingerprint to at least one fingerprint in a fingerprint database maintained by the data protection service, wherein blocks of backup data corresponding to the fingerprints in the fingerprint database are included in previous backups performed by the data protection service from a plurality of sites including the first site; and
excluding the first block from the backup data responsive to detecting the match.

39. The method of example 38 wherein the fingerprint database further includes an organization identifier corresponding to each fingerprint in the fingerprint database, wherein transmitting the first fingerprint further comprises transmitting a first organization identifier identifying the first organization, and wherein detecting the match includes detecting a match for the first organization identifier to the organization identifier corresponding to the at least one fingerprint that matches the first fingerprint.

40. The method of example 38 wherein the fingerprint database further includes an organization identifier corresponding to each fingerprint in the fingerprint database, wherein transmitting the first fingerprint further comprises transmitting a first organization identifier identifying the first organization, and wherein the match is detected even if the first organization identifier does not match the organization identifier corresponding to the at least one fingerprint that matches the first fingerprint.

41. A non-transitory computer accessible storage medium storing a plurality of instructions which, when executed on one or more computers, cause the one or more computers to perform operations of the method of any of examples 38-40.

42. One or more computer systems, each of the one or more computer systems comprising one or more processors coupled to the computer accessible storage medium of example 41.

43. A method comprising:
transmitting a first plurality of fingerprints from a first site of a first organization to a cloud-based data protection service, wherein the first plurality of fingerprints identify a first plurality of data blocks that are to be backed up from the first site to the data protection service;
comparing the first plurality of fingerprints to a second plurality of fingerprints at the data protection service, wherein the second plurality of fingerprints identify a second plurality of data blocks that have previously been backed up at the data protection service, and wherein the second plurality of data blocks have been backed up from sites of a plurality of organizations including the first organization, and wherein the comparing is independent of which organization of the plurality of organizations was a source of a given data block in a previous backup; and
excluding selected ones of the first plurality of data blocks from backup data sent from the first site to the data protection service responsive to corresponding ones of the first plurality of fingerprints matching one or more of the second plurality of fingerprints.

44. The method of example 43 further comprising:
transmitting a third plurality of fingerprints from a second site of a second organization to the data protection service, wherein the third plurality of fingerprints identify a third plurality of data blocks that are to be backed up from the second site to the data protection service;
transmitting a first organization identifier identifying the second organization to the data protection circuit;
comparing the third plurality of fingerprints to the second plurality of fingerprints at the data protection service;

comparing the first organization identifier to a plurality of organization identifiers corresponding to the second plurality of fingerprints, wherein the plurality of organization identifiers identify organizations corresponding to sites that sourced respective ones of the second data blocks;

detecting a match for a first fingerprint of the third plurality fingerprints responsive to matching a second fingerprint of the second plurality of fingerprints as a result of comparing the third plurality of fingerprints to the second plurality of fingerprints and further responsive to matching the first organization identifier to a second organization identifier of the plurality of organization identifiers, wherein the second organization identifier corresponds to the second fingerprint; and excluding a first data block of the third plurality of data blocks from the backup data sent from the second site to the data protection service responsive to detecting the match for the first fingerprint, wherein the first fingerprint identifies the first data block.

45. The method of example 43 or 44 further comprising generating the first plurality of fingerprints by hashing the first plurality of data blocks.

46. A non-transitory computer accessible storage medium storing a plurality of instructions which, when executed on one or more computers, cause the one or more computers to perform operations of the method of any of examples 43-45.

47. One or more computer systems, each of the one or more computer systems comprising one or more processors coupled to the computer accessible storage medium of example 46.

Examples: Backup Post Processing

48. A method comprising:
receiving a partially-populated data descriptor corresponding to a backup from a first site at a data protection service, wherein the data descriptor is a list of fingerprints identifying data blocks in a corresponding backup data from the first site, and wherein the partially-populated data descriptor includes fingerprints for data blocks that have changed from a previous backup from the first site;
obtaining a second data descriptor corresponding to the previous backup; and
merging fingerprints from the second data descriptor into unpopulated locations in the data descriptor to complete the data descriptor.

49. The method of example 48 wherein the receiving the partially-populated data descriptor comprises:
receiving an identifier for the partially-populated data descriptor, the identifier identifying the partially-populated data descriptor in an object storage of a public cloud that hosts the data protection service; and
getting the partially-populated data descriptor from the object storage.

50. The method of example 49 further comprising putting the completed data descriptor in the object storage using the identifier, overwriting the partially-populated data descriptor in the object storage.

51. The method of any of examples 48-50 further comprising:
restoring the backup in the public cloud; and
verifying the restored backup.

52. The method of example 51 wherein the backup corresponds to a first virtual machine from the first site, and wherein restoring the backup comprises establishing a virtual machine in the public cloud and restoring the backup virtual disk data to a block storage provided to the virtual machine.

53. The method of example 52 wherein establishing the virtual machine comprises successfully bidding for a spot instance of the virtual machine.

54. The method of example 52 wherein establishing the virtual machine comprises unsuccessfully bidding for a spot instance of the virtual machine and establishing an on-demand instance of the virtual machine.

55. The method of any of examples 51-54 further comprising generating a file listing from the restored backup.

56. The method of example 55 further comprising putting the file listing in the object storage.

57. The method of example 56 further comprising storing data identifying the backup in the catalog and associating the file listing with the data identifying the backup.

58. The method of any of examples 51-57 further comprising:
scanning the restored backup for one or more security risks; and
notifying an information technology (IT) professional responsive to detecting a security risk.

59. The method of example 58 wherein scanning the restored backup comprises scanning the backup for viruses.

60. The method of example 58 or 59 wherein scanning the restored backup comprises scanning the backup for malware.

61. The method of any of examples 58-60 wherein scanning the restored backup comprises scanning the backup for ransomware.

62. The method of any of examples 58-61 wherein scanning the restored backup comprises scanning the backup for personally identifiable information.

63. The method of any of examples 51-62 further comprising snapshotting the restored backup in the public cloud.

64. A non-transitory computer accessible storage medium storing a plurality of instructions which, when executed on one or more computers, cause the one or more computers to perform operations of the method of any of examples 48-63.

65. One or more computer systems, each of the one or more computer systems comprising one or more processors coupled to the computer accessible storage medium of example 64.

66. A method comprising:
receiving a backup of a first virtual machine from a first site in a cloud-based data protection service;
establishing a second virtual machine in the cloud;
restoring the backup to the second virtual machine; and
verifying the backup in the second virtual machine.

67. The method of example 66 further comprising generating a file index from the backup.

68. The method of example 66 or 67 further comprising scanning the backup for one or more security threats.

69. The method of example 68 wherein the one or more security threats comprise viruses.

70. The method of example 68 or 69 wherein the one or more security threats comprise ransomware.

71. The method of any of examples 68 to 70 wherein the one or more security threats comprise malware.
72. The method of any of examples 68 to 71 wherein the one or more security threats comprise personally identifiable information.
73. A non-transitory computer accessible storage medium storing a plurality of instructions which, when executed on one or more computers, cause the one or more computers to perform operations of the method of any of examples 66-72.
74. One or more computer systems, each of the one or more computer systems comprising one or more processors coupled to the computer accessible storage medium of example 73.

Examples: Restore

75. A method comprising:
    restoring a data set in a public-cloud based data protection service from an object storage in the public cloud;
    reading a plurality of restore data blocks from the data set, wherein each restore data block comprises a plurality of backup data blocks, wherein a backup data block is a unit of data storage for a backup of the data set; and
    putting the plurality of restore data blocks in the object storage.
76. The method of example 75 further comprising compressing the plurality of restore data blocks prior to putting the plurality of restore data blocks in the object storage.
77. The method of examples 75 or 76 further comprising encrypting the plurality of restore data blocks prior to putting the plurality of restore data blocks in the object storage.
78. The method of example 77 further comprising providing a key used to perform the encryption to a requestor that generated the request.
79. The method of any of examples 75-78 wherein restoring the data set comprises restoring the data set to a block storage in the public cloud.
80. The method of any of examples 75-79 wherein the data set comprises a virtual disk corresponding to a virtual machine, and wherein restoring the data set comprises invoking a virtual machine instance in the public cloud and restoring the virtual disk to the virtual machine instance.
81. The method of example 80 further comprising establishing a block storage for the virtual machine instance, wherein the virtual disk is restored to the block storage.
82. The method of examples 80 or 81 further comprising deleting the virtual machine instance responsive to putting the plurality of restore blocks in the object storage.
83. The method of any of examples 75-82 further comprising providing a plurality of identifiers for the plurality of restore blocks in the object storage to a requestor that generated the request.
84. A non-transitory computer accessible storage medium storing a plurality of instructions which, when executed on one or more computers, cause the one or more computers to perform operations of the method of any of examples 75-83.
85. One or more computer systems, each of the one or more computer systems comprising one or more processors coupled to the computer accessible storage medium of example 84.
86. A method comprising:
    restoring a virtual disk from a backup to a virtual machine instance in a public cloud;
    reading a plurality of restore data blocks from the virtual disk, wherein each restore data block comprises a plurality of backup data blocks, and wherein a backup data block is a block of data backed up as a unit in the backup;
    putting the plurality of restore blocks in an object storage in the public cloud; and
    getting the plurality of restore blocks from the object storage into a site from which the virtual disk was previously backed up; and
    restoring the restore blocks to a virtual machine at the site.
87. The method of example 86 further comprising compressing the plurality of restore data blocks prior to putting the plurality of restore data blocks in the object storage.
88. The method of examples 86 or 87 further comprising encrypting the plurality of restore data blocks prior to putting the plurality of restore data blocks in the object storage.
89. The method of example 88 further comprising providing a key used to perform the encryption to the site.
90. The method of any of examples 86-89 wherein restoring the data set comprises restoring the data set to a block storage in the public cloud, wherein the block storage is associated with the virtual machine instance.
91. The method of any of examples 86-90 further comprising deleting the virtual machine instance responsive to putting the plurality of restore blocks in the object storage.
92. The method of any of examples 86-91 further comprising providing a plurality of identifiers for the plurality of restore blocks in the object storage to the site.
93. A non-transitory computer accessible storage medium storing a plurality of instructions which, when executed on one or more computers, cause the one or more computers to perform operations of the method of any of examples 86-92.
94. One or more computer systems, each of the one or more computer systems comprising one or more processors coupled to the computer accessible storage medium of example 93.
95. A method comprising:
    restoring a data set in a public-cloud based data protection service from an object storage in the public cloud;
    reading a plurality of restore data blocks from the data set; and
    putting the plurality of restore data blocks in the object storage.

Examples: Change-Based Restore

96. A method comprising:
    obtaining an indication of a subset of backup data blocks in a data set have been modified after a first backup data set corresponding to the data set was captured, the subset comprising one or more backup data blocks;

restoring at least the subset of backup data blocks from the first backup data set in a public cloud using a cloud-based data protection service;

reading the subset of backup data blocks from the first backup data set in the public cloud responsive to the indication; and selectively updating the data set at a source of the data set with the backup data blocks from the subset.

97. The method of example 96 wherein the source implements a change tracking service, and wherein obtaining the indication comprises querying the change tracking service.

98. The method of example 97 wherein the querying includes a time at which the first backup data set was captured, and wherein a result of the querying identifies the subset of the backup data blocks that have been modified between the time and a present time.

99. The method of any of examples 96-98 further comprising concatenating a plurality of the backup data blocks from the subset into a restore data block.

100. The method of example 99 further comprising compressing the restore data block.

101. The method of example 99 or example 100 further comprising encrypting the restore data block.

102. The method of any of examples 99-101 further comprising providing the restore block to the source.

103. The method of any of examples 99-102 wherein providing the restore block comprises putting the restore block in an object storage of the public cloud by the cloud-based data protection service and getting the restore from the object storage at the source.

104. A non-transitory computer accessible storage medium storing a plurality of instructions which, when executed on one or more computers, cause the one or more computers to perform operations of the method of any of examples 96-103.

105. One or more computer systems, each of the one or more computer systems comprising one or more processors coupled to the computer accessible storage medium of example 104.

106. A method comprising:
   querying a change tracking service to determine which backup data blocks of a virtual disk for a virtual machine have been modified since a first backup of the first virtual disk;
   restoring at least the backup data blocks indicated as modified from the first backup in a virtual machine instance in a public cloud;
   reading the backup data blocks indicated as modified by the change tracking service from the restored first backup in the public cloud; and
   restoring the virtual disk to the first backup by updating the virtual disk at a site with the backup data blocks from the first backup.

107. The method of example 106 further comprising concatenating a plurality of the backup data blocks to form a restore data block.

108. The method of example 107 further comprising compressing the restore data block 109. The method of example 107 or example 108 further comprising encrypting the restore data block.

110. The method of example 109 further comprising decrypting the restore data block and decompressing the restore data block.

111. The method of any of examples 106-110 wherein the updating is based on an indication from the change tracking service identifying which backup data blocks in the virtual disk were modified.

112. The method of any of examples 106-111 further comprising putting the backup data blocks in an object storage in the cloud and getting the backup data blocks from the object storage to the site.

113. The method of example 112 further comprising concatenating the backup data blocks into one or more restore blocks, wherein each of the one or more restore blocks comprises a plurality of backup data blocks, wherein putting the backup data blocks in the object storage comprises putting the one or more restore blocks into the object storage and getting the backup data blocks from the object storage comprises getting the one or more restore blocks from the backup storage.

114. The method of example 113 further comprising compressing and encrypting the one or more restore blocks prior to putting the one or more restore blocks in the object storage.

115. The method of example 114 further comprising decrypting and decompressing the one or more restore blocks in the data center.

116. The method of example 114 or 115 further comprising obtaining a key from key management service in the public cloud to perform the encrypting and the decrypting.

117. A non-transitory computer accessible storage medium storing a plurality of instructions which, when executed on one or more computers, cause the one or more computers to perform operations of the method of any of examples 106-116.

118. One or more computer systems, each of the one or more computer systems comprising one or more processors coupled to the computer accessible storage medium of example 117.

Numerous variations and modifications will become apparent to those skilled in the art once the above disclosure is fully appreciated. It is intended that the following examples be interpreted to embrace all such variations and modifications.

What is claimed is:

1. A non-transitory computer accessible storage medium storing a plurality of instructions forming a data protection service executable in a cloud, where the plurality of instructions, when executed on one or more computer systems, cause the one or more computer systems to perform operations comprising:

receiving, from a site, a first data descriptor corresponding to a complete data set for a backup of the site, wherein the site comprises a physical location at which a data center belonging to an organization is located, wherein the first data descriptor comprises a list of fingerprints and is partially-populated at the site such that:
   the list includes fingerprints identifying data blocks in corresponding backup data from the site for data blocks that have changed from a previous backup from the site; and
   the list includes unpopulated entries for excluded fingerprints for data blocks that have not changed from the previous backup from the site;

obtaining, by the data protection service, a second data descriptor corresponding to the previous backup, wherein the second data descriptor is obtained from the cloud; and merging, by the data protection service, fingerprints from the second data descriptor into the unpopulated entries in the first data descriptor to complete the first data descriptor.

2. The non-transitory computer accessible storage medium as recited in claim 1 wherein the receiving the first data descriptor comprises:
receiving an identifier for the first data descriptor, the identifier identifying the first data descriptor in an object storage of a cloud that hosts the data protection service; and
getting the first data descriptor from the object storage.

3. The non-transitory computer accessible storage medium as recited in claim 2 wherein the operations further comprise putting the completed first data descriptor in the object storage using the identifier, overwriting the first data descriptor that is partially-populated in the object storage.

4. The non-transitory computer accessible storage medium as recited in claim 1 wherein the operations further comprise:
restoring the backup in the cloud; and
verifying the restored backup.

5. The non-transitory computer accessible storage medium as recited in claim 4 wherein the backup corresponds to a first virtual machine from the site, and wherein restoring the backup comprises establishing a second virtual machine in the cloud and restoring the backup to a block storage provided to the second virtual machine.

6. The non-transitory computer accessible storage medium as recited in claim 5 wherein establishing the second virtual machine comprises successfully bidding for a spot instance of the second virtual machine.

7. The non-transitory computer accessible storage medium as recited in claim 5 wherein establishing the second virtual machine comprises unsuccessfully bidding for a spot instance of the second virtual machine and establishing an on-demand instance of the second virtual machine.

8. The non-transitory computer accessible storage medium as recited in claim 4 wherein the operations further comprise generating a file listing from the restored backup.

9. The non-transitory computer accessible storage medium as recited in claim 8 wherein the operations further comprise putting the file listing in an object storage.

10. The non-transitory computer accessible storage medium as recited in claim 4 wherein the operations further comprise:
scanning the restored backup for one or more security risks.

11. The non-transitory computer accessible storage medium as recited in claim 10 wherein scanning the restored backup comprises scanning the backup for viruses.

12. The non-transitory computer accessible storage medium as recited in claim 10 wherein scanning the restored backup comprises scanning the backup for malware.

13. The non-transitory computer accessible storage medium as recited in claim 10 wherein scanning the restored backup comprises scanning the backup for personally identifiable information.

14. The non-transitory computer accessible storage medium as recited in claim 1
wherein a particular one of the unpopulated entries includes a fingerprint of all zero bytes; and
wherein the merging includes replacing the all zero bytes with a valid fingerprint from the second descriptor.

15. A method comprising:
receiving, by a data protection service executable in a cloud and from a site, a first data descriptor corresponding to a backup of the site, wherein the site comprises a physical location at which a data center belonging to an organization is located, wherein the first data descriptor comprises a list of fingerprints for a complete backup data set, and wherein the first data descriptor is partially-populated at the site such that:
the list includes fingerprints identifying data blocks in corresponding backup data from the site for data blocks that have changed from a previous backup from the site; and
the list includes unpopulated locations for excluded fingerprints for data blocks that have not changed from the previous backup from the site;
retrieving, by the data protection service, a second data descriptor corresponding to the previous backup, wherein the second data descriptor is retrieved from the cloud; and
merging, by the data protection service, fingerprints from the second data descriptor into the unpopulated locations in the first data descriptor to complete the first data descriptor.

16. The method as recited in claim 15 further comprising putting the completed first data descriptor in an object storage, overwriting the first data descriptor that is partially-populated in the object storage.

17. The method as recited in claim 15 further comprising:
restoring the backup in a cloud; and
verifying the restored backup.

18. The method as recited in claim 17 further comprising:
scanning the restored backup for one or more security risks.

19. The method as recited in claim 17 further comprising:
scanning the restored backup for personally identifiable information.

20. One or more computer systems, each of the one or more computer systems comprising one or more processors, the one or more processors coupled to a non-transitory computer accessible storage medium storing a plurality of instructions forming a data protection service executable in a cloud which, when executed by the one or more processors, cause the one or more computer systems to perform operations comprising:
receiving, from a site, a first data descriptor corresponding to a backup from the site, wherein the site comprises a physical location at which a data center belonging to an organization is located, wherein the first data descriptor comprises a list of fingerprints having locations for a complete backup data set, and wherein the first data descriptor is partially-populated at the site such that:
the list includes populated locations with fingerprints identifying data blocks in corresponding backup data from the site for data blocks that have changed from a previous backup from the site; and
the list includes unpopulated locations excluding fingerprints for data blocks that have not changed from the previous backup from the site;
obtaining, by the data protection service, a second data descriptor corresponding to the previous backup, wherein the second data descriptor is obtained from the cloud; and
merging, by the data protection service, fingerprints from the second data descriptor into the unpopulated locations in the first data descriptor to complete the first data descriptor, including replacing a placeholder value the fingerprints from the second descriptor.

* * * * *